United States Patent
Soryal

(10) Patent No.: US 12,408,092 B2
(45) Date of Patent: Sep. 2, 2025

(54) FACILITATING ON DEMAND LOCATION BASED SERVICES IN ADVANCED NETWORKS

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 492 days.

(21) Appl. No.: 18/051,994

(22) Filed: Nov. 2, 2022

(65) Prior Publication Data
US 2024/0147335 A1 May 2, 2024

(51) Int. Cl.
| | |
|---|---|
| *H04W 36/32* | (2009.01) |
| *H04W 36/00* | (2009.01) |
| *H04W 36/08* | (2009.01) |
| *H04W 64/00* | (2009.01) |
| *H04W 84/06* | (2009.01) |

(52) U.S. Cl.
CPC ..... *H04W 36/322* (2023.05); *H04W 36/0055* (2013.01); *H04W 36/083* (2023.05); *H04W 64/003* (2013.01); *H04W 84/06* (2013.01)

(58) Field of Classification Search
CPC ........... H04W 36/322; H04W 36/0055; H04W 36/083; H04W 64/003; H04W 84/06
See application file for complete search history.

(56) References Cited

U.S. PATENT DOCUMENTS

| | | | |
|---|---|---|---|
| 9,900,742 B1* | 2/2018 | Thoresen | H04W 4/021 |
| 9,955,298 B1* | 4/2018 | Haney | H04L 67/1046 |
| 2017/0303168 A1* | 10/2017 | Koodli | H04W 36/0094 |
| 2018/0309504 A1* | 10/2018 | Mazzarella | B64D 47/08 |
| 2021/0266907 A1* | 8/2021 | Cui | H04W 24/02 |
| 2022/0109959 A1* | 4/2022 | Shrestha | G01S 3/14 |

* cited by examiner

*Primary Examiner* — Christopher M Brandt
*Assistant Examiner* — Franklin Hayes Castle
(74) *Attorney, Agent, or Firm* — Guntin & Gust, PLC; Atanu Das

(57) ABSTRACT

Facilitating on demand location based services in advanced networks is provided herein. Operations of a system include deploying a group of disposable satellite devices in a defined geographic area including forming a sky network that comprises the group of disposable satellite devices. The group of disposable satellite devices can be independent of network equipment currently dispersed within the defined geographic area. The operations can also include receiving, from a disposable satellite device of the group of disposable satellite devices, coordinate information associated with a monitored user equipment based on the monitored user equipment being within a communication range of the disposable satellite device. Further, the operations can include communicating the coordinate information to the monitored user equipment via a secure communication channel. The secure communication channel bypasses a communication channel established between the monitored user equipment and the network equipment currently dispersed within the defined geographic area.

20 Claims, 18 Drawing Sheets

FACILITATING ON DEMAND LOCATION BASED SERVICES IN ADVANCED NETWORKS

TECHNICAL FIELD

This disclosure relates generally to the field of mobile communications and, for example, to facilitating private and secure location based tracking and services in advanced networks, e.g., Fourth Generation (4G) networks, Fifth Generation (5G) networks, Sixth Generation (6G) networks, or beyond.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G), Sixth Generation (6G), or other advanced standard for wireless communications. Unique challenges exist to provide levels of service associated with forthcoming 5G, 6G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
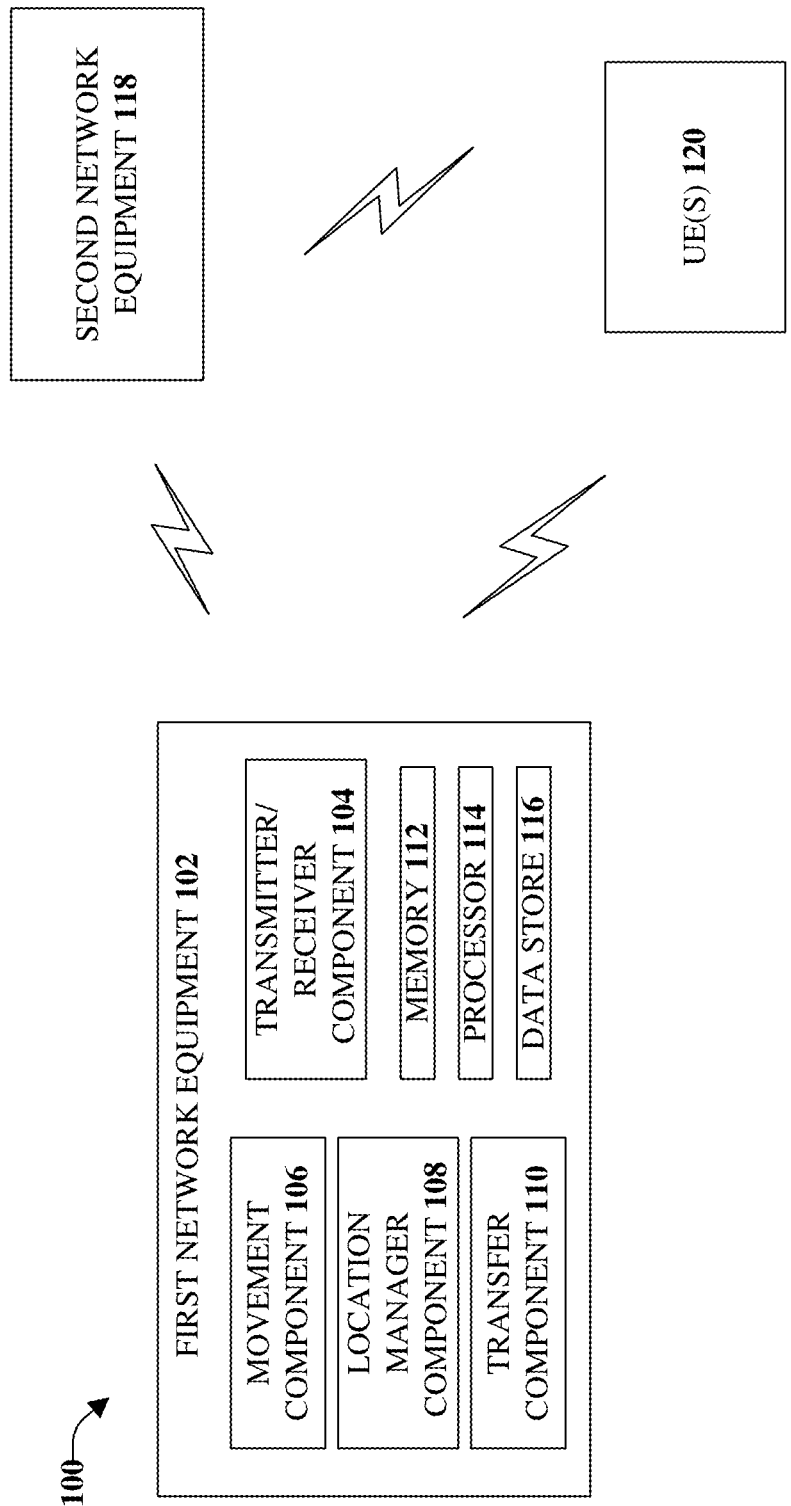
FIG. 1 illustrates an example, non-limiting, system that facilitates on demand location based services in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

The use of communication devices is ubiquitous. Location-based services might need privacy (e.g., a secure and/or private connection) and a defined level of service. Global Positioning System (GPS) and location identification can be problematic for privacy considerations. Further, the GPS signal relies on having line-of-sight to provide its services, which can be difficult in highly dense urban areas (e.g., large cities, areas with high populations, and so on). Further, despite the various technological advances (both civilian and military) that have been developed, GPS and communications can still be tampered with via jamming (e.g., blocking or interference with wireless communications), which also can affect the GPS communications.

The disclosed embodiments provide a private and secure temporary GPS system. Further, the disclosed embodiments facilitate the creation of a temporary GPS and communications satellites system. According to some implementations, at least a portion of the temporary GPS and communications satellites system can be disposable. In addition, energy saving modes can be entered into when usage of the temporary GPS and communications satellites system is not needed. Further, as provided herein, these satellites provide positioning information and communications in hostile environments in the presence of jamming.

An embodiment relates to first network equipment that includes a processor and a memory that stores executable instructions that, when executed by the processor, facilitate performance of operations. The operations can include, based on receipt of a request for secure geographic coordinate tracking of a user equipment, forming an aerial mesh communication network with second network equipment. The first network equipment and the second network equipment are moveable network equipment capable of flight. The operations can also include determining a first location of the user equipment based on a second location of the first network equipment and a distance between the first network equipment and the user equipment. Further, the operations can include updating the first location of the user equipment as the user equipment is moved within a first range of the first network equipment, resulting in a third location of the user equipment. The operations can also include, based on the user equipment moving outside the first range of the first network equipment and into a second range of the second network equipment, transferring monitoring of the user equipment to the second network equipment. The transferring can include transmitting a signal to the second network equipment. The signal can include data indicative of the third location of the user equipment.

According to an implementation, the distance is a first distance. Further, the operations can include, prior to the determining of the first location of the user equipment, determining the second location of the first network equipment. The second location can be determined based on obtaining first information indicative of a geographic coordinate of a location source that comprises a confirmed location and based on a second distance between the location source and the first network equipment.

Further to the above implementations, the location source is stationary network equipment. Alternatively, or additionally, the location source is the user equipment, the user equipment is executing a global positioning system prior to sending the request, and the operations include, after the receipt of the request, sending, to the user equipment, acceptance of the request. The global positioning system can be disabled at the user equipment based on the acceptance of the request.

In accordance with some implementations, the first network equipment and the second network equipment are deployed from an aircraft into an aerial environment. Additionally, or alternatively, according to some implementations, the operations include determining that capabilities of the first network equipment are not currently demanded and entering a sleep mode while maintaining a current aerial position.

According to some implementations, the first network equipment is disposable. Further to these implementations, the operations include, based on a useable life of the first network equipment, determining that the first network equipment is to be disposed. Additionally, based on a current location of the first network equipment, the operations can include facilitating an environmentally conscious disposal of the first network equipment according to a criterion indicating that the environmentally conscious disposal is environmentally conscious.

In accordance with some implementations, the first network equipment is an unmanned autonomous vehicle. According to some implementations, the first network equipment is charged via renewable energy power from a renewable energy power source. In some implementations, the user equipment is classified as an internet of everything device. Further, according to some implementations, the first network equipment is configured to operate according to at least a fifth generation wireless network protocol.

According to another embodiment, a method can include facilitating, by a system comprising a processor, formation of an aerial mesh network that comprises unmanned autonomous vehicles. The method can also include monitoring, by the system, movement of a user equipment as the user equipment moves within range of the unmanned autonomous vehicles. The monitoring can include receiving, from the unmanned autonomous vehicles, respective information indicative of a current location of the user equipment. The method also includes facilitating, by the system, transmitting signals to the user equipment. The signals can include the information indicative of the current location of the user equipment. The transmitting can be via a secure communication channel.

In some implementations, the method can include, prior to the formation of the aerial mesh network, facilitating, by the system, receiving, from the user equipment, a request to enable a private location based service for the user equipment. The request can be facilitated via an application executing on the user equipment.

The method can include, according to some implementations, determining, by the system, that usage of an unmanned autonomous vehicle of the unmanned autonomous vehicles is not currently requested. Further, the method can include facilitating, by the system, a change in status of the unmanned autonomous vehicle. The change in status can be a transition of the unmanned autonomous vehicle from a first state to a second state. For example, the second state is a stand-by mode.

According to some implementations, the method includes determining, by the system, that an unmanned autonomous vehicle of the unmanned autonomous vehicles is to be destroyed. The method also includes facilitating, by the system, a destruction of the unmanned autonomous vehicle in accordance with defined environmental conditions.

Facilitating of the formation of the aerial mesh network can include facilitating, by the system, dispersal of the unmanned autonomous vehicles from an aircraft. Further to these implementations, facilitating of the dispersal is in a geographic area that is experiencing jamming of network equipment, resulting in lack of communication between the network equipment and the user equipment.

Another embodiment relates to a system that can include a processor and a memory that stores executable instructions that, when executed by the processor, facilitate performance of operations. The operations can include deploying a group of disposable satellite devices in a defined geographic area. The deploying can include forming a sky network that comprises the group of disposable satellite devices. The group of disposable satellite devices can be independent of network equipment currently dispersed within the defined geographic area. The operations can also include receiving, from a disposable satellite device of the group of disposable satellite devices, coordinate information associated with a monitored user equipment based on the monitored user equipment being within a communication range of the disposable satellite device. Further, the operations can include communicating the coordinate information to the monitored user equipment via a secure communication channel. The secure communication channel bypasses a communication channel established between the monitored user equipment and the network equipment currently dispersed within the defined geographic area.

According to some implementations, the disposable satellite device is a first disposable satellite device, the coordinate information is first coordinate information, and the communication range is a first communication range. Further to these implementations, the operations can include receiving, from a second disposable satellite device of the group of disposable satellite devices, second coordinate information associated with the monitored user equipment based on the monitored user equipment moving from the first communication range of the first disposable satellite device to a second communication range of the second disposable satellite device. The operations also include communicating the second coordinate information to the monitored user equipment via the secure communication channel.

FIG. 1 illustrates an example, non-limiting, system 100 that facilitates on demand location based services in accordance with one or more embodiments described herein. It is noted that various embodiments are discussed with respect to a fifth generation network communication protocol (e.g., 5G), however, the disclosed aspects are not limited to this implementation. Instead, the disclosed embodiments can be implemented in a 5G network communication protocol, a sixth generation (6G) network communication protocol, a New Radio (NR) communication protocol, and/or other advanced communication protocols.

Aspects of systems (e.g., the system 100 and the like), equipment, User Equipment (UE), network equipment, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

The system 100 can include first network equipment 102 that can include a transmitter/receiver component 104, a movement component 106, a location manager component 108, a transfer component 110, at least one memory 112, at least one processor 114, and at least one data store 116. The system 100 also includes a second network equipment 118 and a user equipment (UE 120). It is noted that although discussed with respect to two network equipment, more than two network equipment can be included in the system. Further, although discussed with respect to a single user equipment, more than one user equipment can be included in the system. Further, according to some implementations, the user equipment can be moved into and out of a communication range of a geographic area serviced by the system 100.

In addition, various functionalities will be discussed with respect to the first network equipment 102. However, the disclosed embodiments are not limited to this implementation. Instead, the functionality described herein can be utilized with other network equipment (e.g., the second network equipment 118 or other network equipment). Additionally, or alternatively, in some implementations, the UE 120 (and/or other UEs) can include one or more components and/or functionalities of the first network equipment 102. For example, the second network equipment 118, other network equipment, the UE 120, and/or other user equipment can include respective transmitter/receiver components, respective movement components, respective location manager components, respective transfer components, respective one or more memories, respective one or more processors, respective one or more data stores, and so forth.

The transmitter/receiver component 104 can receive, from the UE 120, a request for secure geographic coordinate tracking of the UE 120. For example, geographic coordinate tracking (e.g., location tracking) can be a concern in terms of privacy. Such tracking is multi-level, not merely "on" or "off." For example, if there is a child playing on a playground, it can be important for a parent, teacher, or other care giver to know where the child is playing. People, other than those responsible for the child, should not be able to discover details of where the child is playing. However, during a large family gathering at a park, for example, it might be beneficial for the entire family to be able to access information related to the location of the child. Thus, circumstances can dictate the people that should be given access to the information related to the location of the child, while other people are denied access.

Based on receipt of the request, the movement component 106 can facilitate formation of an aerial mesh communication network with second network equipment. For example, the first network equipment 102 and the second network equipment 118 can be movable network equipment. Therefore, the first network equipment 102 can move (via the movement component 106) into a position such that an aerial mesh communication network can be formed with the second network equipment 118 and, in some implementations, other network equipment.

In an alternative implementation, the first network equipment 102 can be non-movable network equipment and/or network equipment that is not utilized as part of an aerial mesh network. According to this implementation, the movement component 106 can facilitate movement of another network equipment (e.g., the second network equipment 118 and other network equipment) into a location such that an aerial mesh communication network is formed. For example, the first network equipment 102 can be utilized as a central controller that provides one or more instructions (e.g., via one or more signals) to other network equipment as discussed herein.

Upon or after the aerial mesh communication network is established, or at another time (e.g., prior to the establishment of the aerial mesh communication network), the location manager component 108 determines a first location of the user equipment based on a second location of the first network equipment and a distance between the first network equipment and the user equipment. For example, to determine the first location of the user equipment, the location manager component 108 can determine a second location of the first network equipment 102. Such determination can be made based on obtaining first information indicative of a geographic coordinate of a location source that comprises a confirmed location and based on a second distance (as well as other geographic coordinate information) between the location source and the first network equipment 102.

Figure 2:
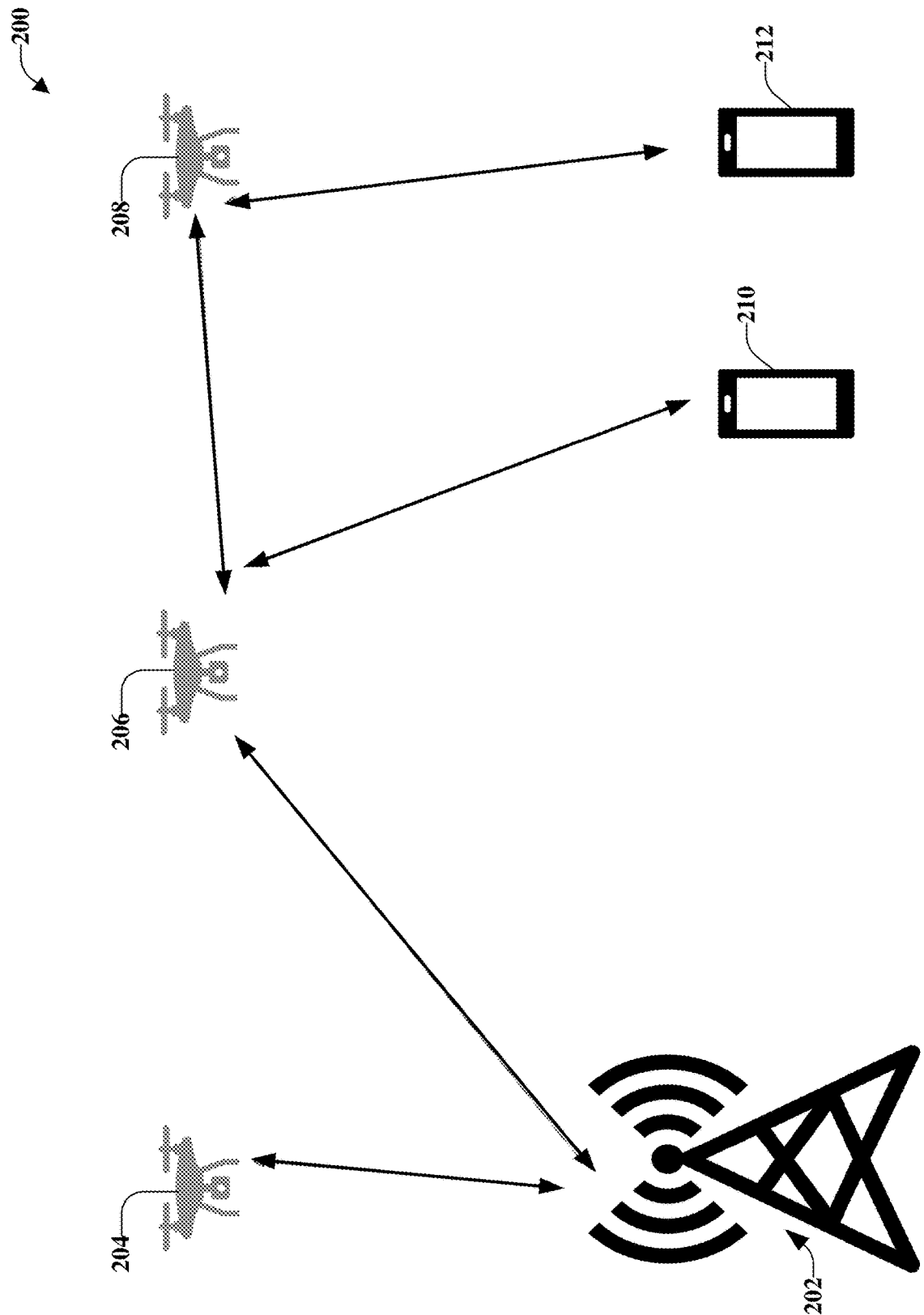
FIG. 2 illustrates an example, non-limiting, system for creation of an aerial mesh communication network for on demand location based services in accordance with one or more embodiments described herein.

In further detail, FIG. 2 illustrates an example, non-limiting, system 200 for creation of an aerial mesh communication network for on demand location based services in accordance with one or more embodiments described herein. Repetitive description of like elements employed in other embodiments described herein is omitted for sake of brevity. The system 200 can comprise one or more of the components and/or functionality of the system 100 and vice versa.

The system 200 includes various network equipment and user equipment. For example, the network equipment can include stationary network equipment and/or movable network equipment. As illustrated, the stationary network equipment can include an access point 202. The movable network equipment can include one or more unmanned autonomous vehicles, which can be drone equipment, an unmanned aerial vehicle, or another device. The system 200 includes three drones, illustrated as a first drone 204, a second drone 206, and a third drone 208. Also included in the system 200 are a first user equipment 210 and a second user equipment 212. It is noted that although four network equipment (e.g., the access point 202, the first drone 204, the second drone 206, and the third drone 208) are illustrated and described, fewer or more than four network equipment can be included in the system 200. Further, although two user equipment are shown and described, more than two user equipment can be included in the system 200.

According to some implementations, the drones or other unmanned autonomous vehicles can be disposable. By being disposable, such network equipment can function as inexpensive satellites (DSats). In accordance with some implementations, the drones can be a type or form of drone that can be powered via renewable energy (e.g., solar power or another type of power).

In an example, the DSats can fly and form a sky network to provide private GPS coverage for a geographical area. The DSats can obtain the coordinates from 5G and 6G cellular towers (e.g., the access point 202) and/or other devices (e.g., the first user equipment 210, the second user equipment 212, or other equipment). For example, many devices have GPS turned on and obtain location information from the commercial GPS. The DSats can move vertically (up and down) in altitude (or in other directions) to move close to the location sources.

Users that are concerned with privacy can install an application on their respective devices. The application can facilitate communication between the respective device and the UAVs and obtain the location from these disposable units.

Further a DSat can connect to multiple cellular towers and/or other DSats to calculate its precise location and then send this information to subscribers (e.g., the UE 120, the first user equipment 210, the second user equipment 212).

With continuing reference to FIG. 1, based on the user equipment moving outside the first range of the first network equipment 102 and into a second range of the second network equipment 118, the transfer component 110 can facilitate a transfer of responsibility of monitoring of the user equipment to the second network equipment. The transfer of the monitoring can include transmitting a signal to the second network equipment 118. For example, the signal can include data indicative of the third location of the user equipment.

The at least one memory 112 can be operatively connected to the at least one processor 114. The at least one memory 112 and/or the at least one data store 116 can store executable instructions that, when executed by the at least one processor can facilitate performance of operations. Further, the at least one processor can be utilized to execute computer executable components stored in the at least one memory and/or the at least one data store.

For example, the at least one memory 112 can store protocols associated with facilitating on demand location based services in advanced networks as discussed herein. Further, the at least one memory can facilitate action to control communication between the first network equipment 102, the second network equipment 118, the UE 120, other network equipment, and/or other user equipment. The at least one processor 114 can employ stored protocols and/or processes to facilitate on demand location based services in advanced networks as described herein. It should be appreciated that data stores (e.g., memories) components described herein can be either volatile memory or nonvolatile memory or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory.

Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory. The at least one processor 114 can facilitate communication tasks, such as determining where to maneuver to form an aerial mesh communication network with one or more other network equipment, from which equipment to obtain location information, tracking of movements to update location information in the absence of receipt of such information from other equipment, tracking of other user equipment, receipt of wireless signals, and so on, as discussed herein. The at least one processor 114 can be a processor dedicated to analyzing and/or generating information received, a processor that controls one or more components of the system 100, and/or a processor that both analyzes and generates information received and controls one or more components of the first network equipment 102.

Figure 3:
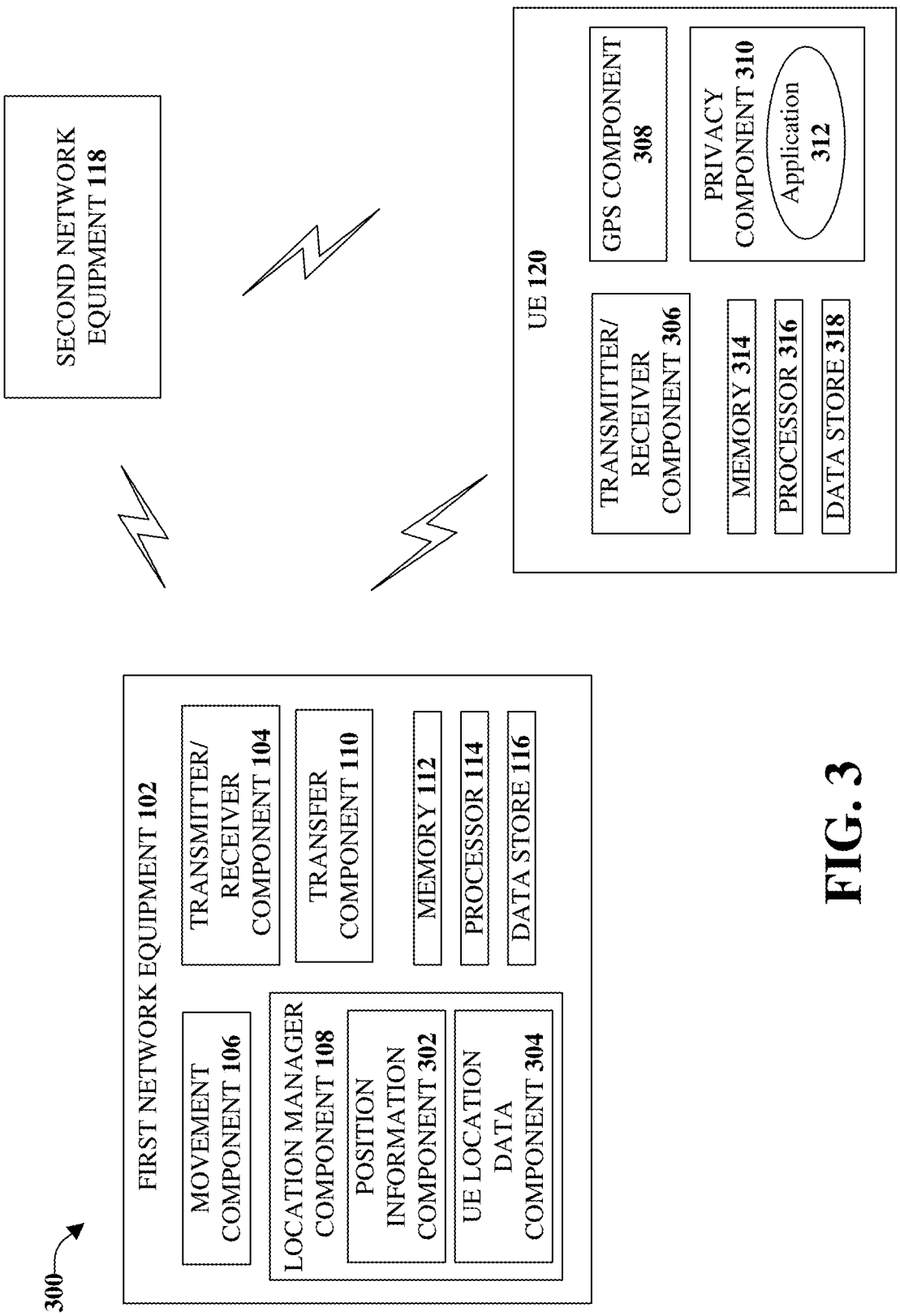
FIG. 3 illustrates an example, non-limiting, system for location determination and user equipment application execution in accordance with one or more embodiments described herein.

FIG. 3 illustrates an example, non-limiting, system 300 for location determination and user equipment application execution in accordance with one or more embodiments described herein. Repetitive description of like elements employed in other embodiments described herein is omitted for sake of brevity. The system 300 can comprise one or more of the components and/or functionality of the system 100, the system 200, and vice versa.

As illustrated, the first network equipment 102 can include a position information component 302 and a UE location data component 304. The position information component 302 can obtain the location of the first network equipment 102 from other network equipment (e.g., the access point 202, the second user equipment 212). For example, the movement component 106 can move the first network equipment 102 closer to a location source (e.g., the access point 202, the second user equipment 212, and so on).

The UE location data component 304 can determine the location of the UE 120.

For example, as the UE 120 is moved, the first network equipment 102 can also move in order to stay within a communication range of the UE 120. Thus, the UE location data component 304 can track movement of the UE 120 from a known location (e.g., determined based on communication with a location source) and a current location. For example, the UE location data component 304 can readjust and recalibrate in order to determine the current location. According to some implementations, the network equipment can communicate among themselves to determine a current location. For example, first equipment might report it has flown 1.1 kilometer to the west and another might report it has flown 0.8 kilometers to the northwest. Such information can be utilized to reconfigure a current location of the equipment based on such coordination among the equipment.

As illustrated, the UE 120 can include a transmitter/receiver component 306, a GPS component 308, a privacy component 310 and related application 312, at least one memory 314, at least one processor 316, and at least one data store 318. In some implementations, the UE 120 might not include a GPS component 308. For example, the UE 120 can be an internet of everything device, an internet of things device, or another device with limited processing capabilities and/or without GPS capabilities. Even though the UE 120 might not have internal GPS capabilities, such capabilities can be provided to the UE 120 via the one or more embodiments described herein.

The GPS component 308 can utilize traditional GPS technology to track a location of the UE 120. However, as discussed, there might be one or more reasons why monitoring (e.g., tracking) of the UE 120 might not be desired (or unavailable) and, therefore, a secure GPS system is needed, at least temporarily. For example, a CEO of a company might be traveling to a merger and acquisition meeting in order to discuss a company that will be acquired. In this case, the CEO might not want the traditional GPS system (e.g., the GPS component 308) to track her movements. Therefore, she can activate the application 312 associated with the privacy component 310 and start the private GPS for this short (or long) drive and associated movement.

This private location based tracking can be established and tiered at any time, with a limited amount of time needed for activation and/or deployment. Further, the temporary GPS can be disposable. For example, rather than the drones continuing to fly, during periods of low activity, the drones can return to a home base or other location such that charging can be performed and/or a useful life of the drones can be extended (based on non-usage of the drones). Thus, upon or after demand for the service, the drones can be activated and assume respective locations in order to provide the services.

For example, the application 312 can be installed on the UE 120 and activated, by the user, when desired by interfacing with the application 312. Upon or after activation of the application 312, information indicative of the request is transmitted to the first network equipment 102 (or other network equipment). Further, upon or after activation of the application 312, a current GPS tracking of the UE 120 (e.g., via the GPS component 308) can be disabled, at least temporarily. The communications associated with the location based tracking can be facilitated via one or more secure communication channels. The signals transmitted via the one or more secure communication channels can be encrypted.

In further detail, subscribers (e.g., users of respective UEs) can download the application (e.g., the application 312) from a service provider onto their respective UEs. Each application has a unique access code (e.g., authentication procedure). Via a 5G infrastructure and/or 6G infrastructure, the service provider knows details related to each participant's location. As discussed, by interacting with the application, the user can turn off the GPS (e.g., the GPS component 308) on their devices and activate the application (e.g., the application 312).

The application can facilitate a search for the beacon for the private DSats (e.g., the first network equipment 102, the second network equipment 118, other network equipment) in case one or more are flying nearby. The application on the UE will obtain a private location from these UAVs (e.g., the first network equipment 102, the second network equipment 118, other network equipment). The connection between the UE and the network equipment can be secure and encrypted so no one would know that this is a GPS communication because the communication uses generic protocols (e.g., HTTPs, and so on). Additionally, drone controllers can be located throughout the service geographical area and can dispatch UAVs based on demand (e.g., a user, via their UE, invokes a DSat as discussed herein).

According to some implementations, the user or other entity can interact with the application 312 via an interface component (not shown), as well as other interface components discussed herein. As utilized herein an entity can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

The interface component can provide a Graphical User Interface (GUI), a command line interface, a speech interface, Natural Language text interface, and the like. For example, a GUI can be rendered that provides an entity with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the entity did want the action performed.

The entity can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the entity for information by providing a text message, producing an audio tone, or the like. The entity can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (VGA)) with limited graphic support, and/or low bandwidth communication channels.

It is noted that the UE 120 can also include one or more components and/or functionality as discussed with respect to the movement component 106, the location manager component 108, the position information component 302, the UE location data component 304, and other components discussed herein. For example, in the absence of one or more network equipment to provide the location information (e.g., while the UE 120 is in a tunnel, a cave, a shaft, or while a user associated with the UE 120 is hiking or traveling in an area with limited, or no, wireless connectivity, and so on), the UE 120 can perform its own tracking. Such tracking by the UE 120 can be performed in a similar (or in a same) way as discussed with respect to the first network equipment 102. The at least one memory 314 can be operatively connected to the at least one processor 316. The at least one memory 314 and/or the at least one data store 318 can store executable instructions that, when executed by the at least one processor can facilitate performance of operations. Further, the at least one processor can be utilized to execute computer executable components stored in the at least one memory and/or the at least one data store.

For example, the at least one memory 314 can store protocols associated with facilitating on demand location based services in advanced networks as discussed herein. Further, the at least one memory can facilitate action to control communication between the UE 120, the first network equipment 102, the second network equipment 118, other network equipment, and/or other user equipment. The at least one processor 316 can employ stored protocols and/or processes to facilitate on demand location based services in advanced networks as described herein. The at least one processor 316 can facilitate communication tasks, such as determining when to request a private GPS service (e.g., a private aerial mesh communication network), from which equipment to obtain location information, tracking of movements to update location information in the absence of receipt of such information from other equipment, receipt of wireless signals, and so on, as discussed herein. The at least one processor 316 can be a processor dedicated to analyzing and/or generating information received, a processor that controls one or more components of the system 300, and/or a processor that both analyzes and generates information received and controls one or more components of the UE 120.

Figure 4:
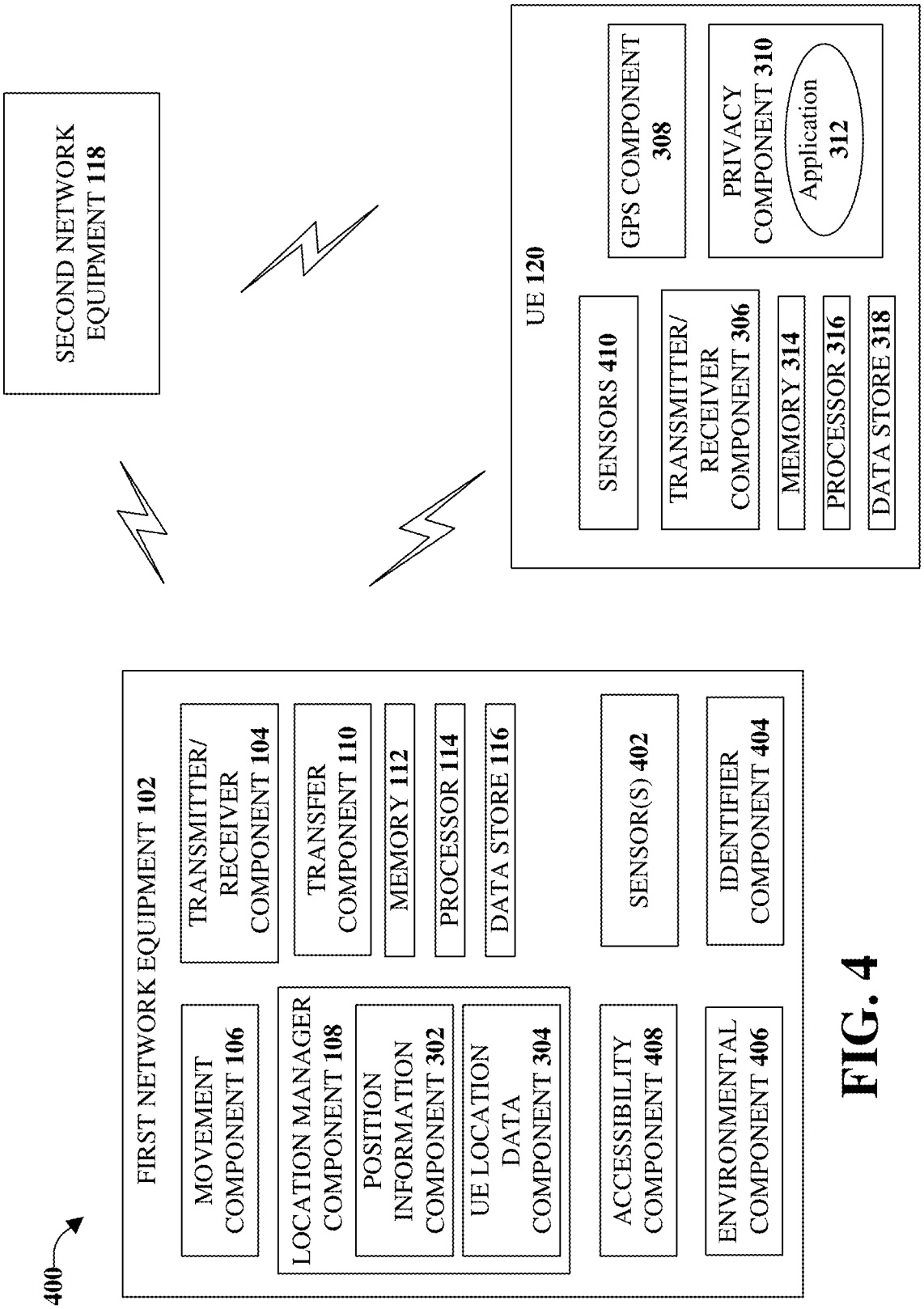
FIG. 4 illustrates an example, non-limiting, system for monitoring one or more conditions related to position services in accordance with one or more embodiments described herein.

FIG. 4 illustrates an example, non-limiting, system 400 for monitoring one or more conditions related to position services in accordance with one or more embodiments described herein. Repetitive description of like elements employed in other embodiments described herein is omitted for sake of brevity. The system 400 can comprise one or more of the components and/or functionality of the system 100, the system 200, the system 300, and vice versa.

The system 400 is intelligent and circumstance aware and/or environment aware. Such awareness can be facilitated via manual configuration and/or via machine learning and observation. For example, if a minor is alone on the street, a privacy aspect for the child can be enabled, and location information is only shared with the parent. Alternatively, if the child is on a school trip, then the privacy aspect can be enabled and location information can be shared with the parents and other authorized persons (e.g., teachers, coaches, guardians, and so on).

According to some implementations, the system 400 can identify one or more individuals for which privacy should automatically be enabled. Such individuals include, but are not limited to, law enforcement personnel and/or journalists on missions in hostile environments and/or situations that become dangerous. For example, users can explicitly notify the application 312 with the circumstances and/or the application 312 can be triggered automatically if out of ordinary aspects occur (e.g., a journalist starts to run, gun shots are heard, and so on).

In another example, if a child is in a stadium attending a sporting event and there are also a large number of people in attendance, it is beneficial to not share the location of the child with others. For example, if a stranger requests to track locations of a child that is nearby (or far away), such location information is not provided. However, if the child is at a family gathering with uncles and cousins that are interacting in a friendly manner, it might be determined that it is okay to share the location information.

The privacy aspect can be triggered by a scheduler (e.g., a system component), by a certain location, and/or based on other parameters. For example, if the child goes out of the playground, then privacy is automatically enabled. In another example, as discussed, pre-merger and/or stock market movers meetings can necessitate the need for privacy and secret project personnel (e.g., Business Enterprise).

As illustrated, the first network equipment 102 can include one or more sensors 402, an identifier component 404, an environmental component 406, and an accessibility component 408. Further, the UE 120 can include one or more sensors 410. The one or more sensors (e.g., the one or more sensors 402 and/or the one or more sensors 410) can be configured to obtain information related to an environment, conditions, and/or other information related to the usage of the UE 120 and/or the one or more network equipment (e.g., the first network equipment 102, the second network equipment 118, and so on). The one or more sensors can include various types of equipment, systems, devices, modules, machine, subsystems, components, or other items that are configured to detect events and/or changes in an environment and process such changes. Further, the one or more sensors can provide information related to the detected events and/or environment changes to one or more other components, devices, or equipment. The one or more sensors can include, but are not limited to, analog sensors, digital sensors, visual sensors, audible sensors, tactile sensors, image sensors, monitoring sensors, biochemical sensors, and other types of sensors.

In an example, non-limiting, use case, at least one sensor of the one or more sensors (e.g., the one or more sensors 402 and/or the one or more sensors 410) can include a camera that can process information. Thus, if another device (e.g., another UE or another system) is requesting information related to the location of a child (or any other person), an image of the requestor can be taken (e.g., via an image capture sensor, such as a camera).

According to some implementations, the identifier component 404 can identify one or more entities attempting to gain access to the position information. For example, the requestor, via their device, might need to provide identifying information, such as name phone number, credit card information, and so on, such that the system 400 has access to the identifying information. However, in some implementations, the user is not able to be verified with such identifying information. Accordingly, one or more facial recognition techniques can be utilized (with or without machine learning as will be discussed herein).

Upon or after an image of the requestor is available, the image can be transmitted via one or more signals to another device that is associated with a trusted person, such that the trusted person can authorize (or not authorize) access to the location information. For example, a guardian can be provided with a prompt (on his respective device, such as via an interface component) whether the requestor should be able to have information related to the location of the child. The prompt can be a request to answer a question (e.g., "Can this person have access to the location information of Timmy?" "This user is asking for little Christina's location, is that okay?"). The accessibility component 408 can selectively authorize access to the location of the UE 120 based on such considerations.

In further detail, the environmental component 406 can observe conditions and/or situations occurring in an environment of the user of the UE 120. In such a manner, the system 400 can be intelligent and circumstances and/or environment aware either by manual configuration or via machine learning and observation. For example, if a minor is alone on the street, then the privacy aspect (as discussed herein) is enabled for the child and the information can be shared with the parents. However, if the child is on a school trip, then enable the privacy aspect and share it with the parents and the adults supervising the school trip.

The system can understand since these little UAVs have cameras (e.g., a sensor of the one or more sensors), the UAV can understand the environment and the situations in which privacy should be implemented and/or selectively shared with others. In an example, school or child use case, the system 400 can know the application 312 is installed on a device of a child under 10 years old or 8 years old (or any person of any age). When the UAV flies over the child, the UAV can recognize other persons in the environment (e.g., this bigger and older person is the teacher, this other person is the aide, and so on) and, as such can automatically enable access of the location of the child to these people, but not to others. The accessibility component 408 can selectively authorize access to the location of the UE 120 based on such considerations.

Thus, if the teacher and school aide have the application installed on their respective devices, they can track the kid, but a stranger just passing by has nothing to do with the kid, or the kid is afraid of them based on observation of the environment and/or audio, it will not allow the stranger to access the child's location, especially at a later time (even though the application is installed on the stranger's device). It is aware of the circumstances and the environment and other systems.

The system identifies privacy in-need individuals such as law enforcement and journalists on missions. For example, users can explicitly notify the application with the circumstances and/or privacy or can be triggered automatically if an out of ordinary event occurs (such as journalist starting to run). The privacy aspect can be triggered by a scheduler or by certain location (e.g., if the child goes out of the playground, then enable privacy). Pre-merger and stock market movers meetings privacy and secret project personal, and so on.

Figure 5:
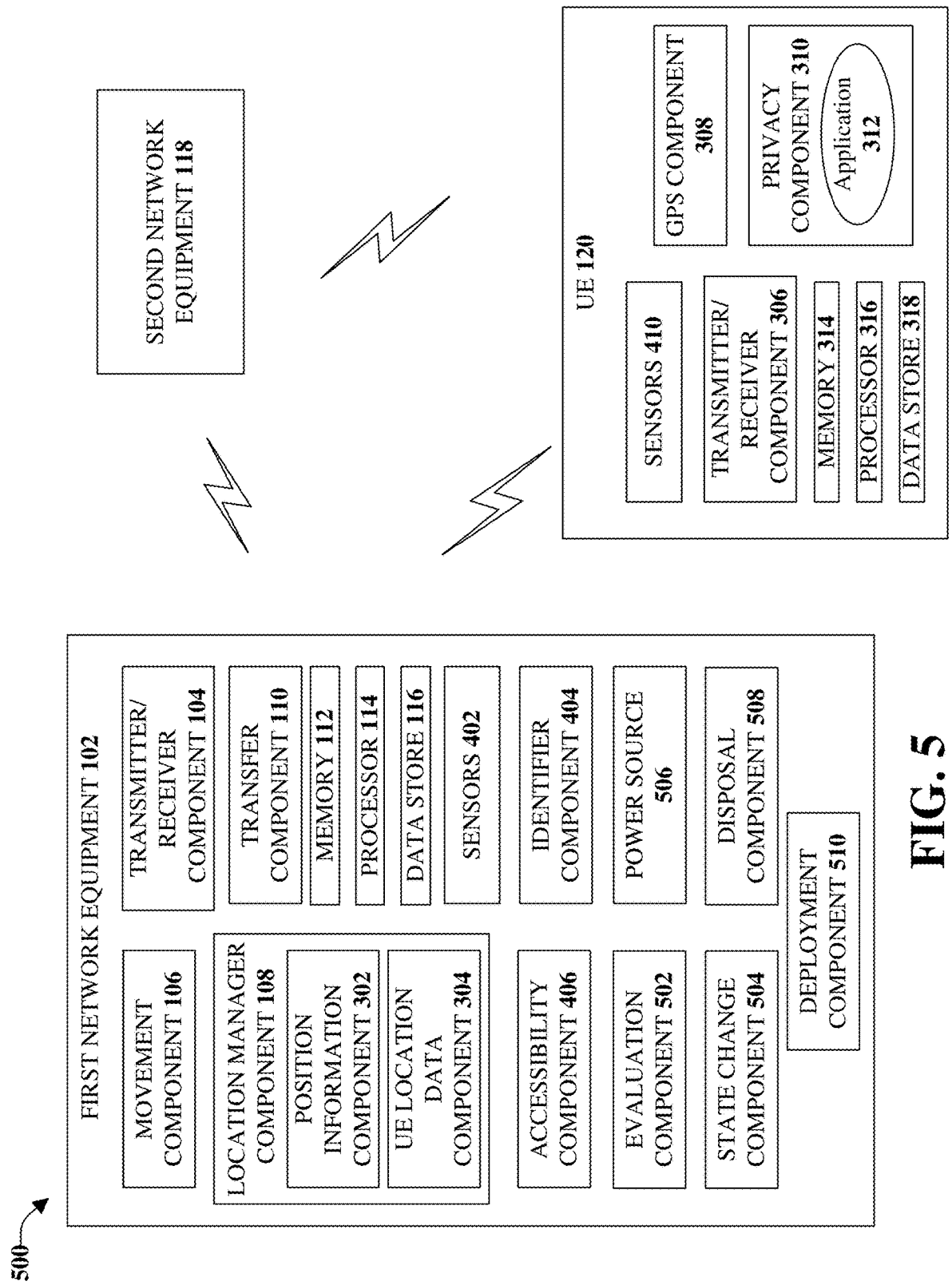
FIG. 5 illustrates an example, non-limiting, system for preserving environmental considerations associated with position services in accordance with one or more embodiments described herein.

FIG. 5 illustrates an example, non-limiting, system 500 for preserving environmental considerations associated with position services in accordance with one or more embodiments described herein. Repetitive description of like elements employed in other embodiments described herein is omitted for sake of brevity. The system 500 can comprise one or more of the components and/or functionality of the system 100, the system 200, the system 300, the system 400, and vice versa.

An evaluation component 502 can determine whether or not capabilities of the first network equipment 102 are being currently demanded. For example, a user of the service might want the confidential positions services for a limited time and, thereafter, the traditional GPS services (e.g., via the GPS component 308) are adequate. Accordingly, there might be times when the services of the first network equipment 102 are not necessary, which can be determined by the evaluation component 502.

If the determination is that the services of the first network equipment 102 are currently not needed, the state change component 504 can cause the first network equipment 102 to change its state or mode, while maintaining a current aerial position. For example, the state change component 504 can change the state or mode of the first network equipment 102 from an active mode to a sleep mode.

In further detail, the system 500 can provide a temporary stand alone GPS system for environments where line of sight is problematic or where there is high usage of services. Disposable drones (e.g., Unmanned Autonomous Vehicles) that function as cheap satellites (DSat) in the form of a drone that is renewable energy powered (e.g., via a power source 506) is provided. Thus, the first network equipment 102 can be charged via renewable energy power from a renewable energy power source 506.

The DSats fly and form a sky network to provide private GPS coverage for a geographical area. The DSats obtain the coordinates from 5G and 6G cellular towers and other devices (since most devices have GPS turned on and they obtain their location from the commercial GPS). The DSats move up and down in altitude (or in other directions) to get close to the location sources.

Users concerned with privacy can install an application (e.g., the application 312) that communicates with these UAVs and obtain the location from these disposable units. The UAVs can go into sleep mode while up in the air if there is no demand, which can reduce interference. Upon or after there is a demand for the services, the first network equipment 102 can transition from the sleep mode (standby mode, or other mode) to an active mode (or other mode).

In an example use case, the drones can be available for everyone in a city (e.g., in Manhattan). Thus, the drones can be used for multiple UEs. However, in some cases, and based on a service level agreement with a user, one or more drones can be dedicated for a UE, at least temporarily, if increased confidentiality is desired by the user.

In another example, there can be an underground garage and the garage owner or manager can purchase (or otherwise obtain) a group of drones that provide location based services to users of the garage. For example, if there are different directions that a vehicle can travel in the garage, or if there is a tunnel that the vehicle has to pass through, the drones can provide location based services when the GPS signal is lost. The transition to the location based services can occur automatically when the GPS signal is not available (e.g., in the absence of manual activation by the user(s)). According to some implementations, the location based service information can be overlaid on a map application, can provide traffic information, and/or direction information.

In some implementations, the first network equipment 102 is disposable and can include a disposal component 508. According to these implementations, the disposal component 508 (or another component) can determine whether or not the first network equipment 102 should be disposed based on a usable life of the first network equipment 102. If the equipment is to be disposed and based on a current location of the first network equipment 102, the disposal component 508 can facilitate an environmentally conscious disposal of the first network equipment according to a criterion indicating that the environmentally conscious disposal is environmentally conscious.

For example, there can be many (e.g., dozens, hundreds, thousands, and so on) drones that are inexpensive, and, when no longer needed or near or at an expected life span (or when damaged), can discard themselves. In an example, the equipment can be programmed to turn itself on and short circuit itself in an inconspicuous way (e.g., the equipment does not have to blow up or destroy itself in a dramatic manner). In another example, the equipment can search for a trash can (e.g., via the one or more sensors 402, the environment component 512, and/or another component) and fly to deposit themselves in the trash can. In another example, if the equipment is made of perishable material, the equipment can be programmed to find water and throw themselves in water (or another type of material). Thus, the equipment can be configured to be environmentally conscious.

Figure 6:
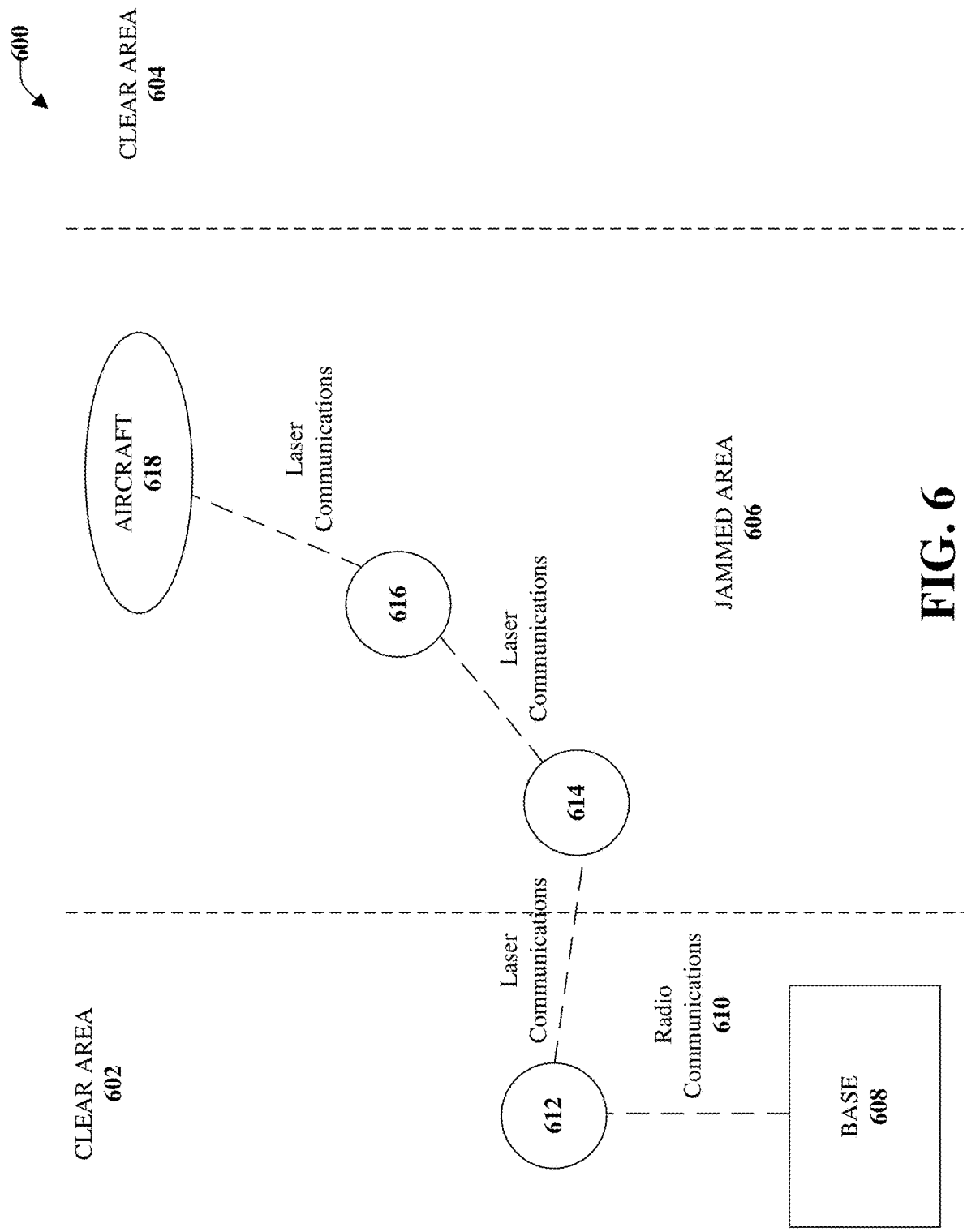
FIG. 6 illustrates an example, non-limiting, environment in which creation of temporary global positioning system and communications satellites systems is facilitated in accordance with one or more embodiments described herein.

The first network equipment 102 can also include a deployment component 510 that can deploy one or more drones in an environment. For example, FIG. 6 illustrates an example, non-limiting, environment 600 in which creation of temporary GPS and communications satellites systems is facilitated in accordance with one or more embodiments described herein. Repetitive description of like elements employed in other embodiments described herein is omitted for sake of brevity. The environment 600 can comprise one or more of the components and/or functionality of the system 100, the system 200, the system 300, the system 400, the system 500, and vice versa.

The system 500 can disperse (e.g., via the deployment component 510), within the environment 600, position information equipment within a jammed area, for example. According to some implementations, the temporary GPS and communication satellite system can include equipment that is disposable. As illustrated, the environment 600 includes one or more geographic areas where communication is available (e.g., first clear area 602 and second clear area 604), and one or more geographic areas where communication is disrupted (e.g., jammed area 606). The jammed area 606 can represent a place where a conflict is occurring and/or where a rogue entity is disrupting communication signals.

There can be a base 608 from where one or more radio communications 610 can be transmitted to a dual communication drone 612. Further, disposable drones can function as cheap satellites (DSats) in the form of drones that are renewable energy powered. The DSats (illustrated as a first repeater drone 614 and a second repeater drone 616) can be released from an aircraft 618 (e.g., a flying plane). Although only two repeater drones are illustrated, more than two repeater drones can be released as discussed herein.

For example, the aircraft 618 can drop the drones based on a periodic distance (e.g., a maximum distance where two adjacent DSats can communicate effectively). The distance can be dynamic and can depend on the weather condition, speed of the aircraft 618 that releases these units, and other considerations.

The aircraft 618, when it takes off, can take an accurate GPS reading from fixed locations such as 5G RAN towers. The aircraft 618 (or associated components, such as the components discussed with respect to the first network equipment 102) can calculate the distance and direction to know its accurate position and before releasing the DSats. In such a manner, the aircraft 618 can be configured with the last known good position. The drones (e.g., the first repeater drone 614, the second repeater drone 616, and other repeater drones) can go through sleep and wake up periods based on a preconfigured schedule to avoid detection.

The drones (e.g., the first repeater drone 614, the second repeater drone 616, and other repeater drones) form a temporary network. The aircraft 618 can communicate with the drones, as indicated by the laser communication links, until the aircraft 618 reaches the second clear area 604. When the aircraft release the drones, the speed, the direction, and the weather conditions, and so forth, are known. So, if the weather condition is bad, more drones will be released so that the drones are close to each other. If the weather is clear, the drones can be spaced out. Thus, the system 500 (e.g., via the location manager component 108 or another component) can account for the releasing time, retains information related to the location, and creates an end to end location.

Within the jammed area 606 all communications (e.g., the satellites) in this area is jammed. However, the drones can operate as location reference points, and can be similar to laser communication. In an example, the drones could transmit laser beams, could be regular communication, and/or can also be used for communication, not just location. In implementations where the drones are also used for communication, such drones can have more processing power for communication, as compared to drones that only provide location information. Further, since the drones are released from an aircraft, the drones can be manufactured or fabricated to be hardened in a certain way in order to survive the pressure and altitude of being dispersed in such a manner.

Figure 7:
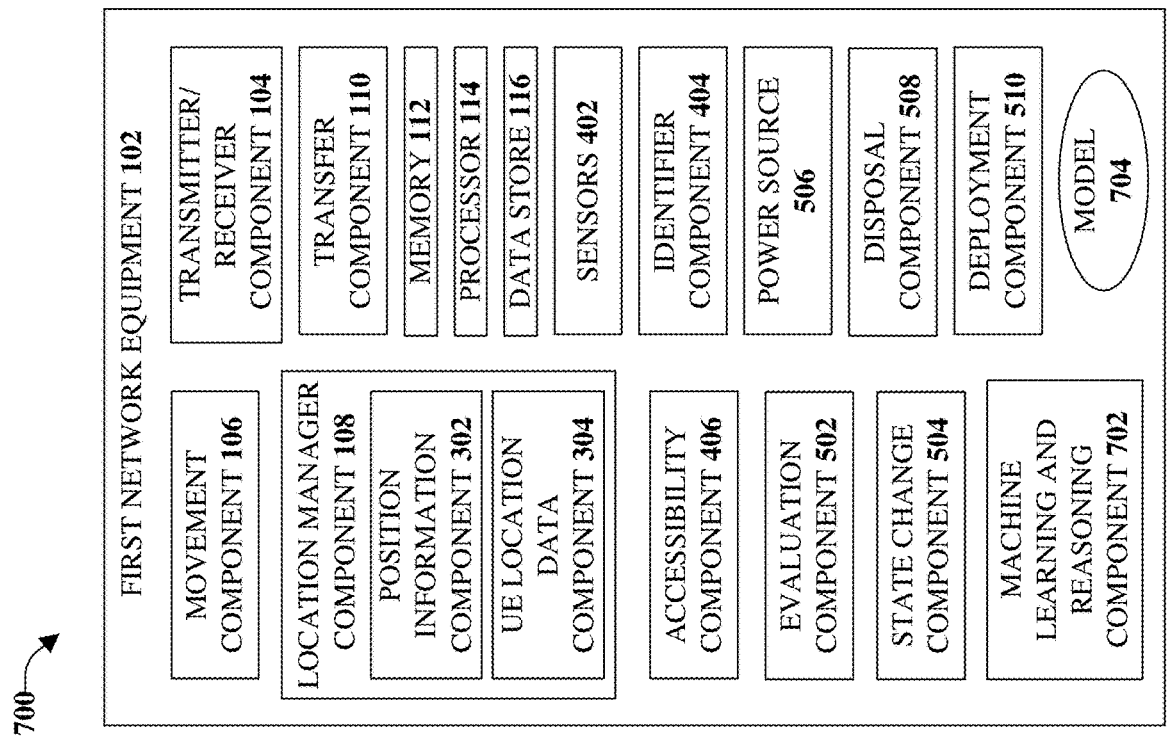
FIG. 7 illustrates an example, non-limiting, system that employs automated learning that trains a model to facilitate one or more of the disclosed aspects in accordance with one or more embodiments described herein.

FIG. 7 illustrates an example, non-limiting, system 700 that employs automated learning that trains a model to facilitate one or more of the disclosed aspects in accordance with one or more embodiments described herein. Repetitive description of like elements employed in other embodiments described herein is omitted for sake of brevity. The system 700 can comprise one or more of the components and/or functionality of the system 100, the system 200, the system 300, the system 400, the system 500, and vice versa.

The system 700 can utilize machine learning to train a model to identify an opportunity to perform on demand location based services. The model can be trained to a defined confidence level. As illustrated, the system 700 can comprise a machine learning and reasoning component 702 that can be utilized to automate one or more of the disclosed aspects based on training a model 704. The machine learning and reasoning component 702 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 702 can employ principles of probabilistic and decision theoretic inference. Additionally, or alternatively, the machine learning and reasoning component 702 can rely on predictive models (e.g., the model 704) constructed using automated learning and/or automated learning procedures. Logic-centric inference can also be employed separately or in conjunction with probabilistic methods.

The machine learning and reasoning component 702 can infer whether a mesh network should be formed in order to perform on demand private location services, how to form the mesh network, when to allow access to GPS position information, when to deny access to the GPS position information, and so on. For example, the GPS position information can be related to a mobile device (e.g., a UE) that is moved from location to location and, thus, privacy for various reasons might be needed. Alternatively, or additionally, the mobile device might lose communication connectivity with a traditional GPS service and, thus, can be provided with GPS information from one or more disposable satellites and/or autonomously (e.g., the UE can perform its own location based service), as discussed herein. Based on this information, the machine learning and reasoning component 702 can determine whether a secure location based service should be implemented, how to provide the service (e.g., via one or more satellites, satellites dedicated for the UE or able to be used for multiple UEs), and/or whether the UE should perform its own tracking.

Further, the machine learning and reasoning component 702 can determine how to power DSats, such machine learning and/or artificial intelligence can anticipate and understand the location of the demand or potential demand by privacy users and move into areas of high demand. The movement can be performed automatically or autonomously by the DSats. Based on this knowledge, the machine learning and reasoning component 702 can make an inference based on when to activate a DSat, when and how to form an aerial mesh network, when to change a power level of a DSat, and so on. According to some implementations, the DSats are powered via machine learning and/or artificial intelligence. According to some implementations, the GPS private signal can be overlaid on map application, can provide traffic information, and/or direction information.

As used herein, the term "inference" refers generally to the process of reasoning about or inferring states of a system, a component, a module, an environment, and/or devices from a set of observations as captured through events, reports, data and/or through other forms of communication. Inference can be employed to identify when corrective measures, such as selectively forming an aerial mesh network, selectively activating one or more DSats, what actions should be taken to improve a user experience (e.g., not allowing a device to be tracked by others, providing direction information, providing communication capabilities, and so on), powering devices dynamically to increase a useable life of the devices (e.g., mitigate an amount of disposable devices), or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with providing secure and confidential location tracking in 5G communication networks, 6G communication networks, new radio communication networks, and/or other advanced networks) can employ various artificial intelligence-based schemes for carrying out various aspects thereof. For example, a process for determining if one or more devices are available (or are expected to be available) to track locations of one or more UEs, and/or whether a mesh network should be formed to facilitate the tracking, when to activate and/or deactivate tracking devices (e.g., as connected devices (e.g., devices associated with a group of people, such as a family gathering) move away from one another a distance limit is established, after the distance limit is reached, tracking is automatically disabled), and so on can be enabled through an automatic classifier system and process.

A classifier is a function that maps an input attribute vector, x=(x1, x2, x3, x4, xn), to a confidence that the input belongs to a class. In other words, f(x)=confidence (class). Such classification can employ a probabilistic and/or statistical-based analysis (e.g., factoring into the analysis utilities and costs) to provide a prognosis and/or infer one or more actions that should be employed to determine whether activation and/or deactivation of secure location based tracking should be enabled, with whom to share the location based information, if at all. In the case of priorities, for example, attributes can be identification of one or more applications executing on a device and/or a device profile that indicates the device is associated with emergency resources or a vulnerable person (e.g., child, disabled person, journalist in a volatile situation, and others), and so on.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing equipment feedback associated with location based tracking, an efficiency associated with a specific modality of a DSat, a mode or state change that should be enacted at the DSat to reduce interference and/or conserve resources, by receiving implicit information, based on an inference, and so on. For example, SVMs can be configured through a learning or training phase within a classifier constructor and feature selection module. Thus, a classifier(s) can be used to automatically learn and perform a number of functions, including but not limited to determining, according to a predetermined criterion, when to track a UE, when to restrict or allow availability of the location information to others, how the location tracking should be implemented, how to distribute devices in a jammed communication area, and so forth. The criteria can include, but is not limited to, historical information, feedback information, one or more user requests, an increase in the amount of equipment utilizing location based services in a defined area, and so forth.

According to some implementations, seed data (e.g., a data set) can be utilized as initial input to the model 704 to facilitate the training of the model 704. In an example, if seed data is utilized, the seed data can be obtained from one or more historical data associated with location based tracking, equipment data, and/or other information indicative of trusted users and/or other information related to location based tracking (including feedback data) in the communication network. However, the disclosed embodiments are not limited to this implementation and seed data is not necessary to facilitate training of the model 704. Instead, the model 704 can be trained on new data received.

The data (e.g., seed data and/or new data) can be collected and, optionally, labeled with various metadata. For example, the data can be labeled with an indication of the communication protocol being utilized for communication amongst the equipment, respective applications executing on the equipment, or other data, such as identification of respective equipment that provided one or more requests to receive location based data, and so on.

According to some implementations, the functionality, or at least a portion thereof, of the first network equipment 102, can be included on the UE 120. As such, the UE 120 can perform its own tracking (e.g., bypassing the GPS component 308). For example, the UE 120 can have an intrinsic location application. For example, the UE 120 can be an autonomous cell phone (while GPS is off) and can calculate its position based on speed and direction without user intervention. Such functionality can be utilized to help identify missing persons and/or their location where a communication signal is not available or GPS is turned off.

The application is suitable for children and hikers where they go off the grid. The application can be activated and can calculate the location based on moving speed and direction. In this mode, the readings might not be as accurate as they would be if communications were available, however, the readings can provide at least a general idea of location and can provide useful information to the user.

In an example of a hiker, the last point that an accurate (or nearly accurate) GPS position was obtained might be at a beginning of the hiking trail (or some location along the hiking trail) where there was a signal. However, when inside a mountain, forest, low lying area, extremely rural or wilderness locations, the signal can be lost. Thus, the application on the UE 120 can perform the location based services without the use of a drone by calculating the approximate location of the UE 120. For example, the UE knows the last known good location (cell tower or GPS). Then once in the lost signal location, the UE can determine that the UE was moved to the left 20 feet, then went up 30 feet, then moved to a next location, and so on. The UE can continually (or continuously) monitor and calculate the movement of the device in order to keep the approximate location up to date. If a situation occurs (e.g., medical emergency or another type of trigger event), the UE can broadcast a signal, and can keep broadcasting, in case someone else is passing by or there is some receiver or other equipment that is able to receive the signal. This is performed by the UE itself, in the absence of drones and/or other wireless communication.

Such tracking by the UE (without the use of other equipment) can be performed anywhere. This can be beneficial if a user does not want a social media site tracking her location. Thus, all GPS and/or position tracking by external equipment can be disabled and the UE will do its best to track the location. This can also be used where drones were used to track the location, but have reached the farthest point they are able to travel from a base location. At that point, if other drones are not available, the UE can assume the position tracking.

Figure 8:
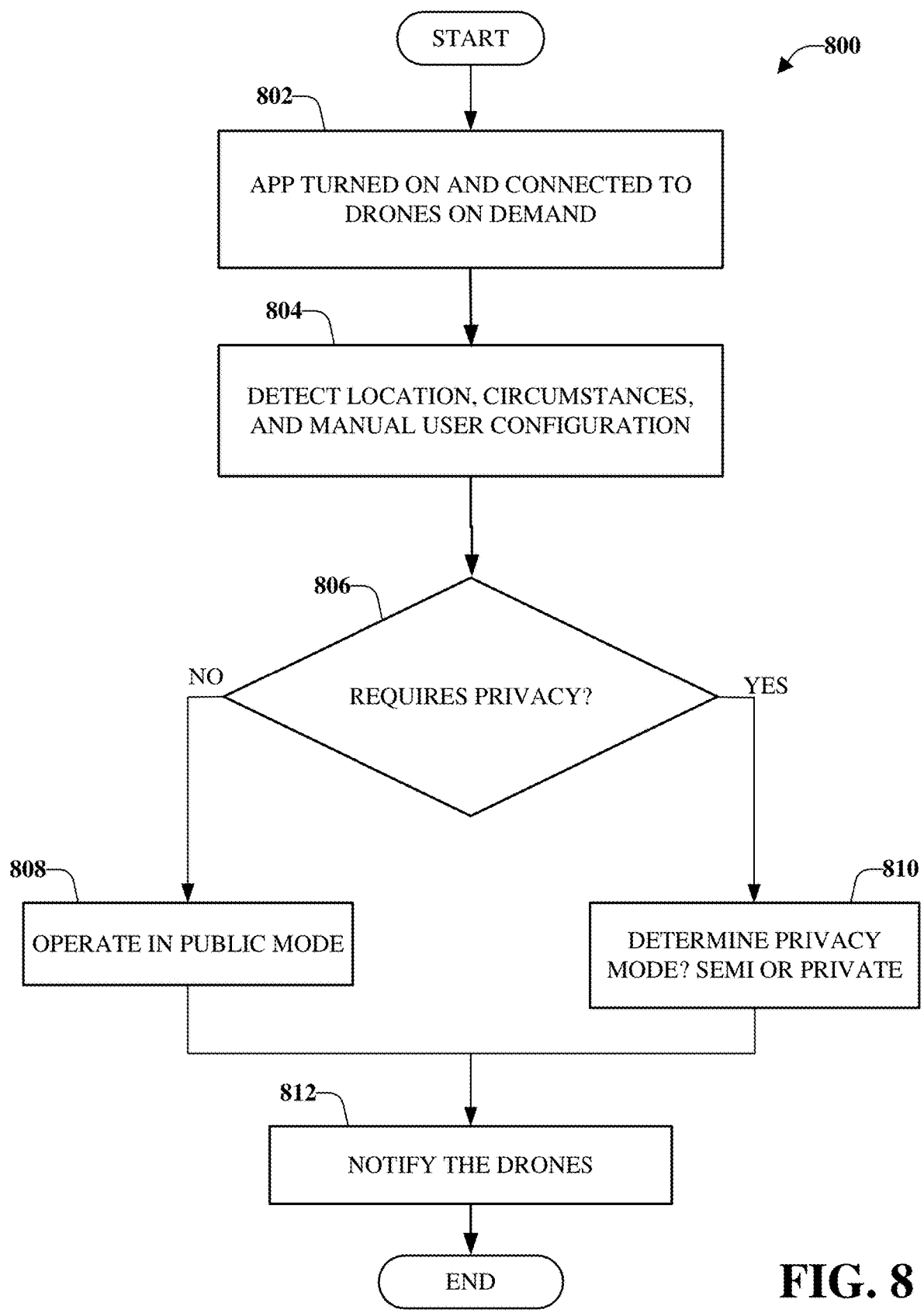
FIG. 8 illustrates an example, non-limiting, computer-implemented method for facilitating on demand location services that leverage privacy and security protected GPS trigger in accordance with one or more embodiments described herein.

FIG. 8 illustrates an example, non-limiting, computer-implemented method 800 for facilitating on demand location services that leverage privacy and security protected GPS trigger in accordance with one or more embodiments described herein. Repetitive description of like elements employed in other embodiments described herein is omitted for sake of brevity. The computer-implemented method 800 can be implemented by a system including a memory and a processor, user equipment including memory and a processor, network equipment including a memory and a processor, a network controller including a memory and a processor, or another computer-implemented device including a memory and a processor.

Location-based services that need privacy and a certain level of service can include, for example, employees on a mission, such as meeting other employees from another company that should remain confidential. In this situation (or other situations where privacy is desired), each individual can active (or alert) applications on their respective devices to provide secret GPS for the entire trip.

The confidential GPS monitoring can include private, semi private, and/or public (legacy) triggers. For example, some use cases should have pure privacy where only the individual obtains the GPS signal and only the individual knows the location. In contrast, in a semi private use case where a group of users, such as friends on an outing or a group of journalists, should be aware of the whereabouts (e.g., location) of the people within the group. According to some implementations, privacy protected location service that is on-demand (e.g., based on request) can be utilized for enterprise consumers and/or military personnel. In an example, uber versus family outing which dictates the event and/or circumstances of the privacy level needed.

The computer-implemented method 800 starts at 802 when an application (e.g., the application 312) is activated and connected to one or more drones on-demand. The location circumstances, and/or manual user configuration is detected at 804. A determination is made, at 806, whether privacy is required, if privacy is not requested ("NO"), operation in public mode can be facilitated at 808 (e.g., via the GPS component 308). However, if the determination at 806 is that privacy is required ("YES"), at 810, the type of privacy mode (e.g., private, semi-private, and so on) can be determined and implemented. At 812, the drones are notified.

Figure 9:
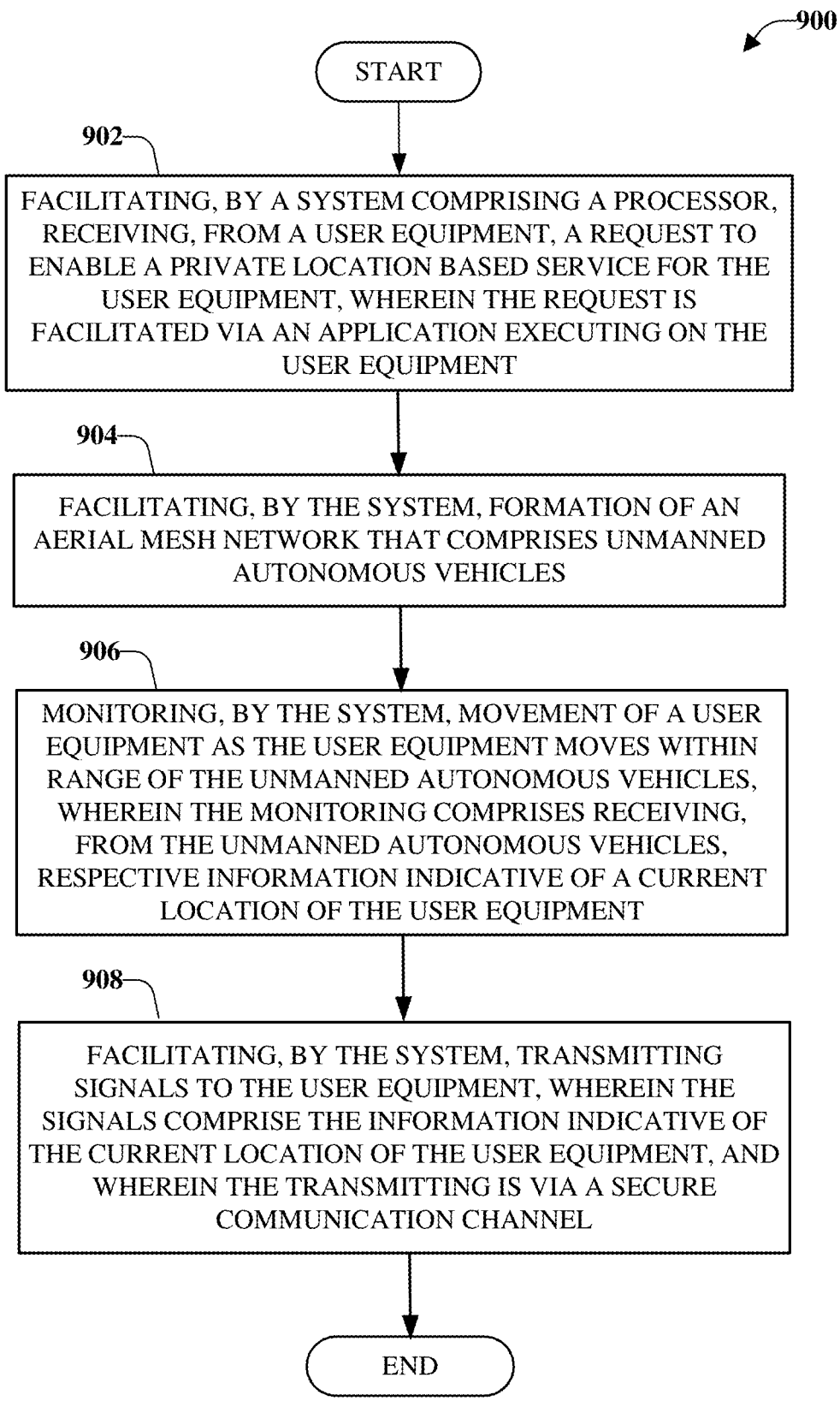
FIG. 9 illustrates an example, non-limiting, computer-implemented method for facilitating on demand location based services in accordance with one or more embodiments described herein.

FIG. 9 illustrates an example, non-limiting, computer-implemented method 900 for facilitating on demand location based services in accordance with one or more embodiments described herein. Repetitive description of like elements employed in other embodiments described herein is omitted for sake of brevity. The computer-implemented method 900 can be implemented by a system including a memory and a processor, user equipment including memory and a processor, network equipment including a memory and a processor, a network controller including a memory and a processor, or another computer-implemented device including a memory and a processor.

The computer-implemented method 900 starts, at 902, when a system comprising a processor facilitates receipt, from user equipment, of a request to enable a private location based service for the user equipment (e.g., via the transmitter/receiver component 104). The request can be facilitated via an application executing on the user equipment.

At 904, formation of an aerial mesh network that comprises unmanned autonomous vehicles is facilitated (e.g., via the movement component 106). At 906, movement of a user equipment is monitored as the user equipment moves within range of the unmanned autonomous vehicles (e.g., via the location manager component 108). The monitoring can include receiving, from the unmanned autonomous vehicles, respective information indicative of a current location of the user equipment.

At 908, the computer-implemented method 900 facilitates transmitting signals to the user equipment (e.g., via the transmitter/receiver component 104). The signals can include the information indicative of the current location of the user equipment. Further, transmitting the signals can be via a secure communication channel.

Figure 10:
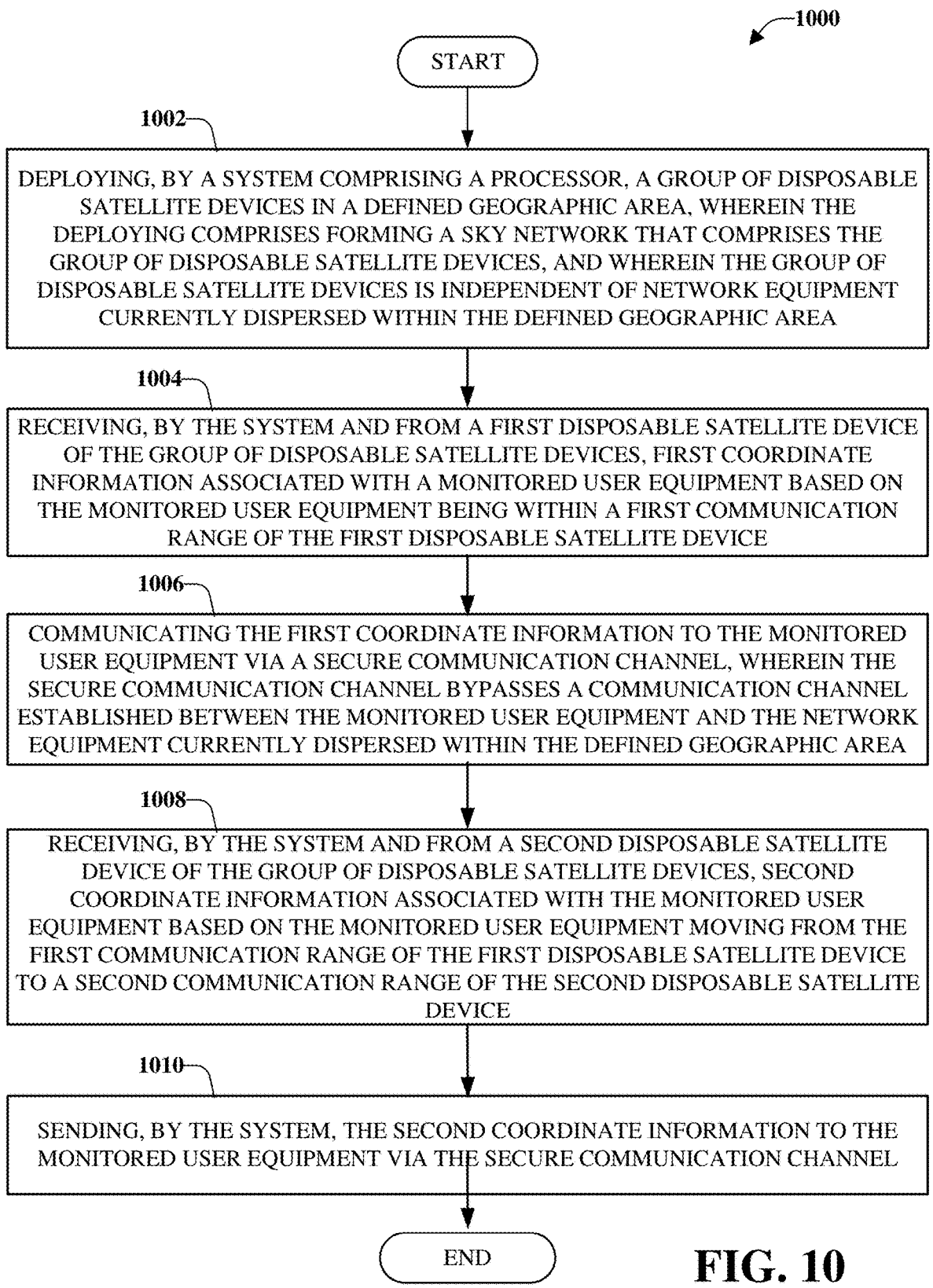
FIG. 10 illustrates an example, non-limiting, computer-implemented method for facilitating usage of disposable drones for providing on demand location based services in accordance with one or more embodiments described herein.

FIG. 10 illustrates an example, non-limiting, computer-implemented method 1000 for facilitating usage of disposable drones for providing on demand location based services in accordance with one or more embodiments described herein. Repetitive description of like elements employed in other embodiments described herein is omitted for sake of brevity. The computer-implemented method 1000 can be implemented by a system including a memory and a processor, user equipment including memory and a processor, network equipment including a memory and a processor, a network controller including a memory and a processor, or another computer-implemented device including a memory and a processor.

At 1002, a group of disposable satellite devices are deployed in a defined geographic area. Deploying the satellite devices can include forming a sky network that comprises the group of disposable satellite devices. The group of disposable satellite devices can be independent of network equipment currently dispersed within the defined geographic area.

At 1004, the computer-implemented method 1000 can include receiving, from a first disposable satellite device of the group of disposable satellite devices, first coordinate information associated with a monitored user equipment. The first coordinate information can be based on the monitored user equipment being within a first communication range of the first disposable satellite device.

The first coordinate information can be communicated to the monitored user equipment via a secure communication channel, at 1006. The secure communication channel bypasses a communication channel established between the monitored user equipment and the network equipment currently dispersed within the defined geographic area.

Further, at 1008, second coordinate information associated with the monitored user equipment can be received from a second disposable satellite device of the group of disposable satellite devices. The second coordinate information can be received based on the monitored user equipment moving from the first communication range of the first disposable satellite device to a second communication range of the second disposable satellite device. The second coordinate information can be sent to the monitored user equipment via the secure communication channel at 1010.

Figure 11:
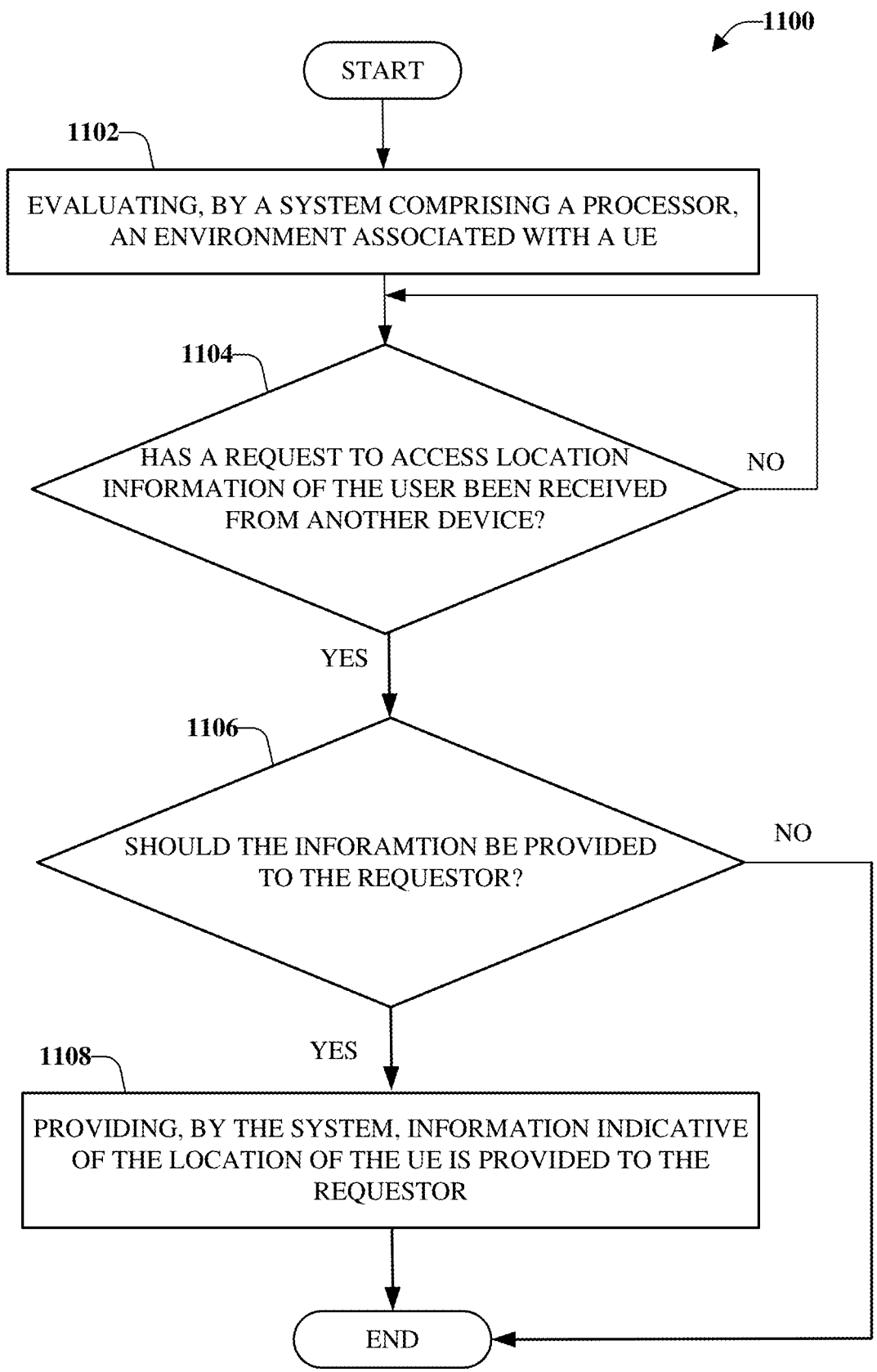
FIG. 11 illustrates an example, non-limiting, computer-implemented method for selectively allowing access to position information in accordance with one or more embodiments described herein.

FIG. 11 illustrates an example, non-limiting, computer-implemented method 1100 for selectively allowing access to position information in accordance with one or more embodiments described herein. Repetitive description of like elements employed in other embodiments described herein is omitted for sake of brevity. The computer-implemented method 1100 can be implemented by a system including a memory and a processor, user equipment including memory and a processor, network equipment including a memory and a processor, a network controller including a memory and a processor, or another computer-implemented device including a memory and a processor.

At 1102 an environment associated with a UE is evaluated. The evaluation of the environment can include monitoring one or more persons that are located near the user of the UE. The monitoring can include evaluating interactions between the one or more people and the user, if any. According to some implementations, the monitoring can include evaluating a situation associated with the user (e.g., is the user with a group of people or on her own, are the people around the user known associates of the user or are they strangers, and so on).

At 1104 a determination is made whether a request to access location information of the user is received from another device. If not ("NO"), the computer-implemented method 1100 continues with the monitoring until it is determined that a request for access location is received ("YES").

Upon or after it is determined that the request is received, a determination is made, at 1106, whether the information can be provided to the requestor. For example, information related to an environment and/or interaction between the requestor and user of the device can be evaluated to determine whether the information can be provided. In another example, specific details related to the requestor can be output at the UE or another device requesting an explicit response whether the information can be provided to the requestor. If the determination is that the information cannot be provided ("NO"), the computer-implemented method 1100 ends. However, if the information can be provided ("YES"), at 1108 information indicative of the location of the UE is provided to the requestor.

Such information can be provided for a defined amount of time (e.g., during a field trip) or another amount of time. According to some implementations, the information can be provided until the computer-implemented method 1100 receives explicit instructions to stop providing the information. Alternatively, or additionally, the information can be provided until the occurrence of an event (e.g., a group of people is no longer engaging in an activity together).

Figure 12:
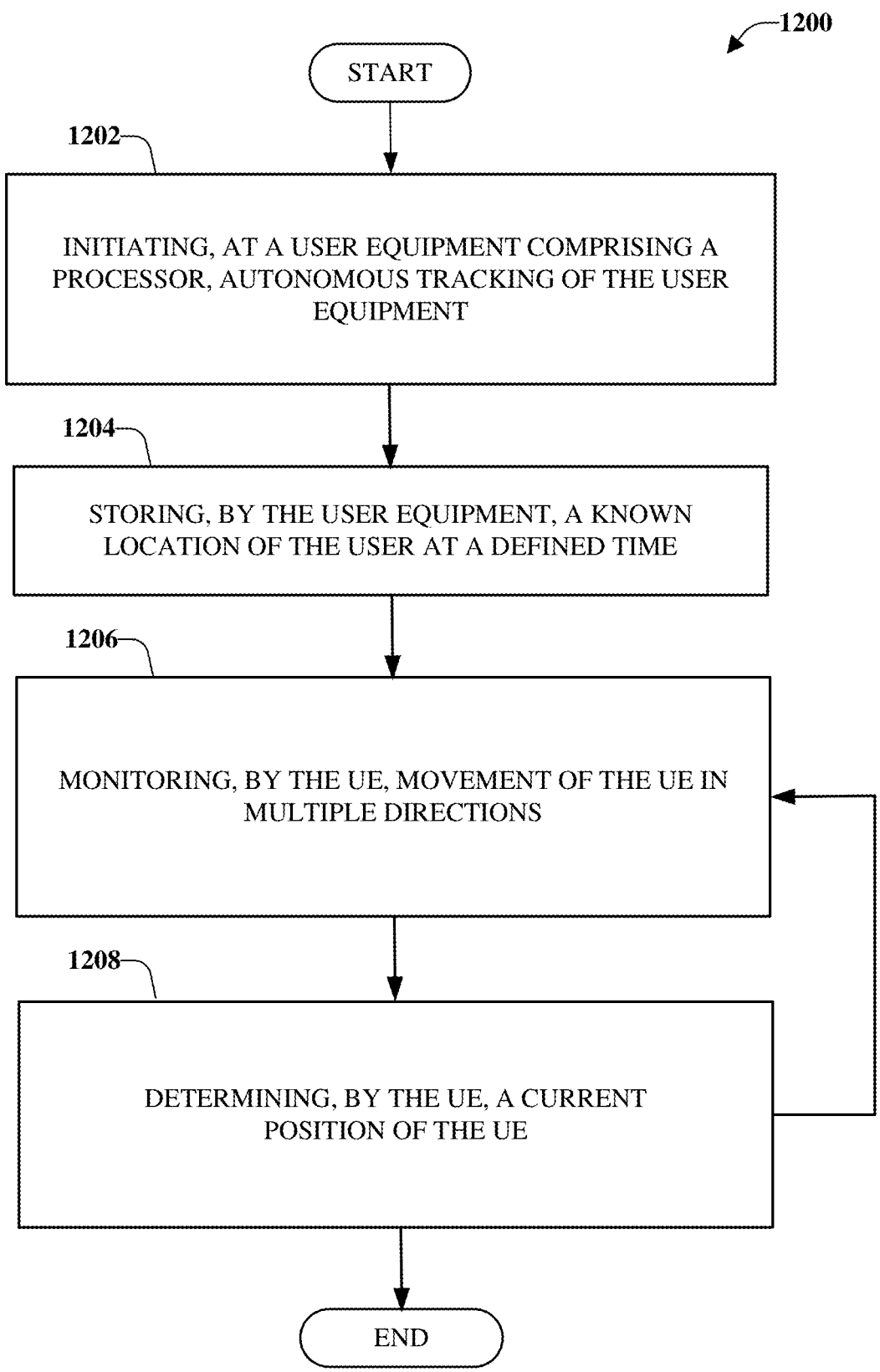
FIG. 12 illustrates an example, non-limiting, computer-implemented method for performing autonomous location based tracking at a user equipment in accordance with one or more embodiments described herein.

FIG. 12 illustrates an example, non-limiting, computer-implemented method 1200 for performing autonomous location based tracking at a user equipment in accordance with one or more embodiments described herein. Repetitive description of like elements employed in other embodiments described herein is omitted for sake of brevity. The computer-implemented method 1200 can be implemented by a system including a memory and a processor, user equipment including memory and a processor, network equipment including a memory and a processor, a network controller including a memory and a processor, or another computer-implemented device including a memory and a processor.

At 1202, autonomous tracking at a UE is initiated. The initiation can be based on an explicit instruction to begin the tracking (e.g., a user activating an application). In some implementations, the tracking is initiated based on a determination that traditional GPS and/or drone-based tracking systems as discussed herein is no longer available.

A known location of the UE at a defined time is stored, at 1204. The known location can be stored in a data structure (e.g., the at least one data store 318, the at least one memory 314). For example, the known location can be a last location as reported by the GPS system or the drone-based tracking system.

Movement of the UE in multiple directions is monitored, at 1206. The movement can be determined based on segments of movement. For example, segments can be a first distance of movement in a first direction, a second distance of movement in a second direction, and so on for subsequent distances of movement in subsequent directions. The distances of movement can be different distances. Upon or after each segment of movement, a current position of the UE is determined, at 1208. Thus, the computer-implemented method 1200 can continue, at 1206, for each segment of movement and the determination of a current location, at 1208. This can be repeated such that the movements can be monitored and a current position can be determined any number of times. The various determinations of the current location can be stored in a data structure and/or memory. Upon or after autonomous tracking of the UE is finished, the computer-implemented method ends.

Figure 13:
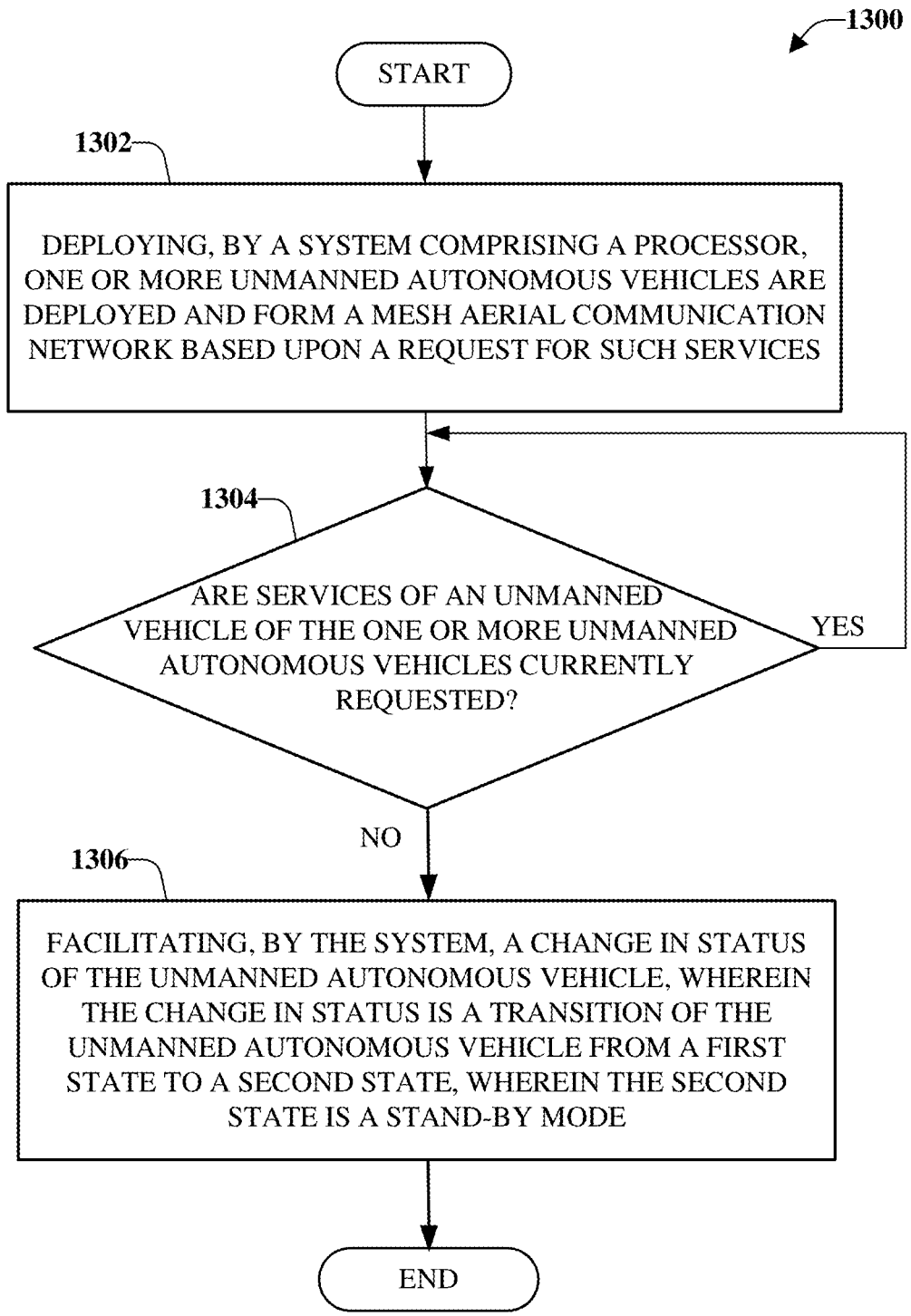
FIG. 13 illustrates an example, non-limiting, computer-implemented method for conserving resources related to location based tracking in accordance with one or more embodiments described herein.

FIG. 13 illustrates an example, non-limiting, computer-implemented method 1300 for conserving resources related to location based tracking in accordance with one or more embodiments described herein. Repetitive description of like elements employed in other embodiments described herein is omitted for sake of brevity. The computer-implemented method 1300 can be implemented by a system including a memory and a processor, user equipment including memory and a processor, network equipment including a memory and a processor, a network controller including a memory and a processor, or another computer-implemented device including a memory and a processor.

At 1302, one or more unmanned autonomous vehicles are deployed and form a mesh aerial communication network based upon a request for such services. At 1304, a determination is made whether usage of an unmanned vehicle of the one or more unmanned autonomous vehicles is currently being requested. If so ("YES"), the computer-implemented method 1300 continues with the monitoring until it is determined that the usage of the unmanned vehicle is no longer being requested ("NO"). Upon or after it is determined that the usage of the unmanned vehicle is not currently needed, at 1306, a change in status of the unmanned autonomous vehicle is facilitated. For example, the status of the unmanned vehicle can be transitioned from a first state to a second state. In an example, the first state can be an active state and the second state can be a stand-by mode. However, other modes can be utilized for the first state and/or the second state.

For example, the UAVs can go into sleep mode, while up in the air, if there is no demand. By entering a sleep mode (or sleep state), interference caused by these UAVs to other devices can be reduced and/or mitigated. Further, the sleep mode can conserve resources (e.g., battery power, processing power, and so on) of the UAV.

The computer-implemented method 1300 can continue to monitor the request for service and upon or after the UAV is needed, the state of the UAV can be transitioned from the second state back to the first state. Accordingly, the UAVs can be activated and/or deactivated any number of times based on demand for services of the UAVs.

Figure 14:
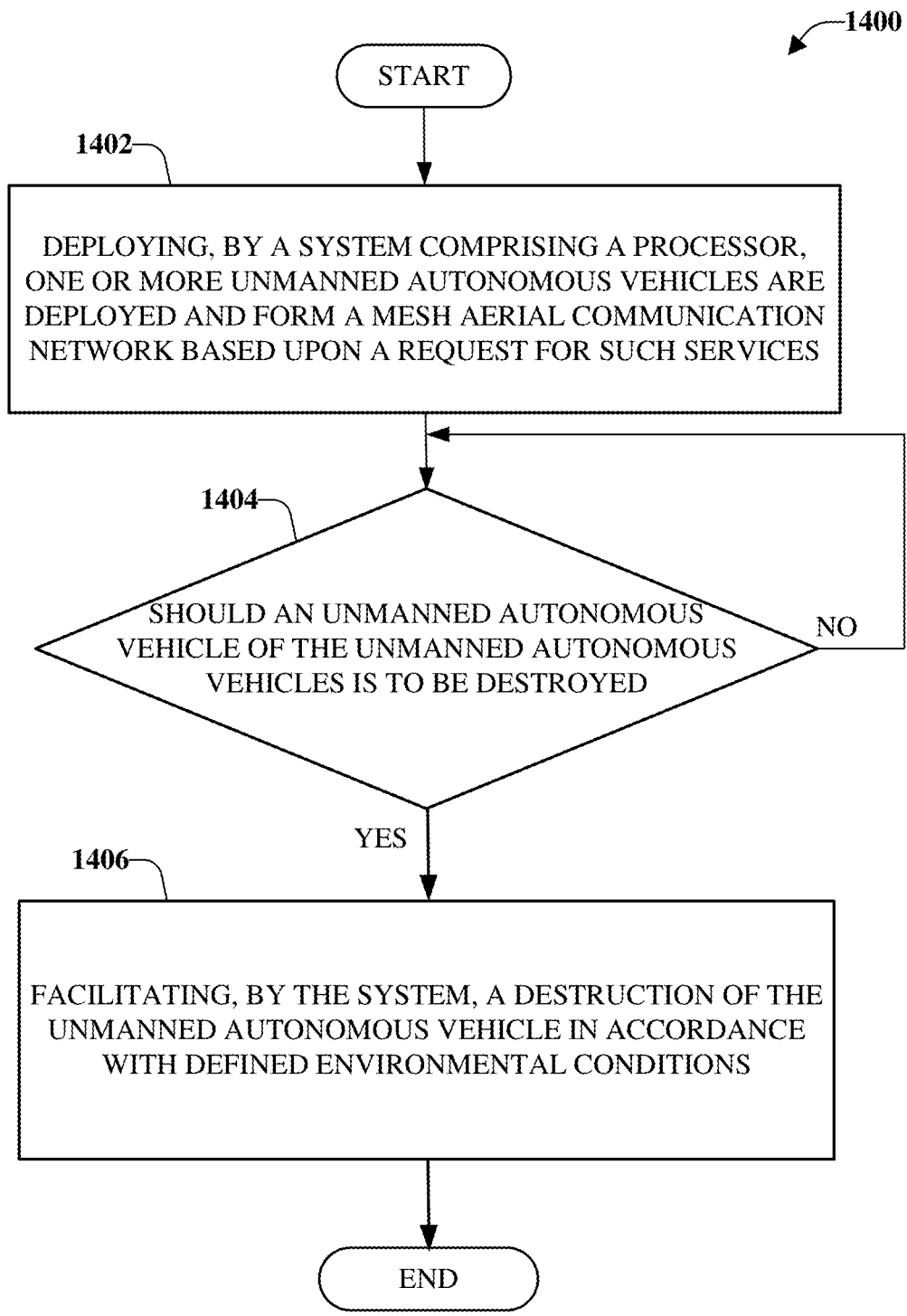
FIG. 14 illustrates an example, non-limiting, computer-implemented method for disposing equipment associated with location based tracking in accordance with one or more embodiments described herein.

FIG. 14 illustrates an example, non-limiting, computer-implemented method 1400 for disposing equipment associated with location based tracking in accordance with one or more embodiments described herein. Repetitive description of like elements employed in other embodiments described herein is omitted for sake of brevity. The computer-implemented method 1400 can be implemented by a system including a memory and a processor, user equipment including memory and a processor, network equipment including a memory and a processor, a network controller including a memory and a processor, or another computer-implemented device including a memory and a processor. A similar process can be performed for the other autonomous vehicles of the one or more autonomous vehicles.

At 1402, one or more unmanned autonomous vehicles are deployed and form a mesh aerial communication network based upon a request for such services. At 1404, a determination is made whether an unmanned autonomous vehicle of the unmanned autonomous vehicles is to be destroyed. For example, instructions can be related to a useful life (e.g., a life span measured in time or another parameter (e.g., distance traveled, weather conditions operated in, type of damage experienced by the equipment, and so on) can be evaluated. If the determination is that the unmanned autonomous vehicle is not to be destroyed, ("NO"), the computer-implemented method 1400 continues with the monitoring until it is determined that the unmanned autonomous vehicle is to be destroyed, ("YES"). Upon or after it is determined that the unmanned autonomous vehicle is to be destroyed, at 1406, a destruction of the unmanned autonomous vehicle in accordance with defined environmental conditions is facilitated. A similar process can be performed for the other autonomous vehicles of the one or more autonomous vehicles.

Figure 15:
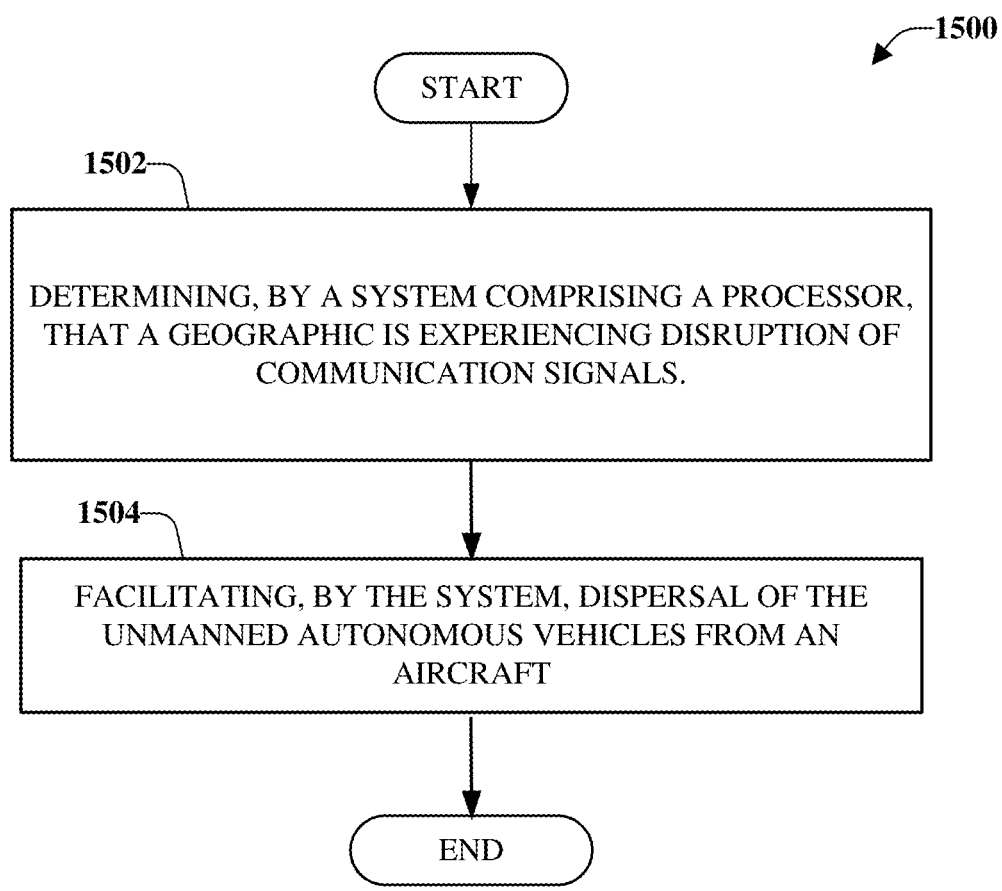
FIG. 15 illustrates an example, non-limiting, computer-implemented method for dispersing, within a defined area, equipment associated with location based tracking in accordance with one or more embodiments described herein.

FIG. 15 illustrates an example, non-limiting, computer-implemented method 1500 for dispersing, within a defined area, equipment associated with location based tracking in accordance with one or more embodiments described herein. Repetitive description of like elements employed in other embodiments described herein is omitted for sake of brevity. The computer-implemented method 1500 can be implemented by a system including a memory and a processor, user equipment including memory and a processor, network equipment including a memory and a processor, a network controller including a memory and a processor, or another computer-implemented device including a memory and a processor. A similar process can be performed for the other autonomous vehicles of the one or more autonomous vehicles.

The computer-implemented method starts at 1502, with a determination that a geographic area, or a portion thereof, is experiencing disruption of communication signals. The disruption can be based on intentional and/or unintentional signal loss that results in lack of communication between the network equipment and the user equipment. For example, the intentional signal loss can be due to jamming or other disruptions. The unintentional signal loss can be based on various factors including the weather, a large amount of network traffic in an area, or based on other conditions.

Due to the disruption, at 1504, dispersal of the unmanned autonomous vehicles from an aircraft is facilitated. The dispersal can include determining the number (or amount) of devices to disperse in an area, the density of devices, the distance between devices (e.g., a time between when a first device is deployed and a second device is deployed), and so on.

Figure 16:
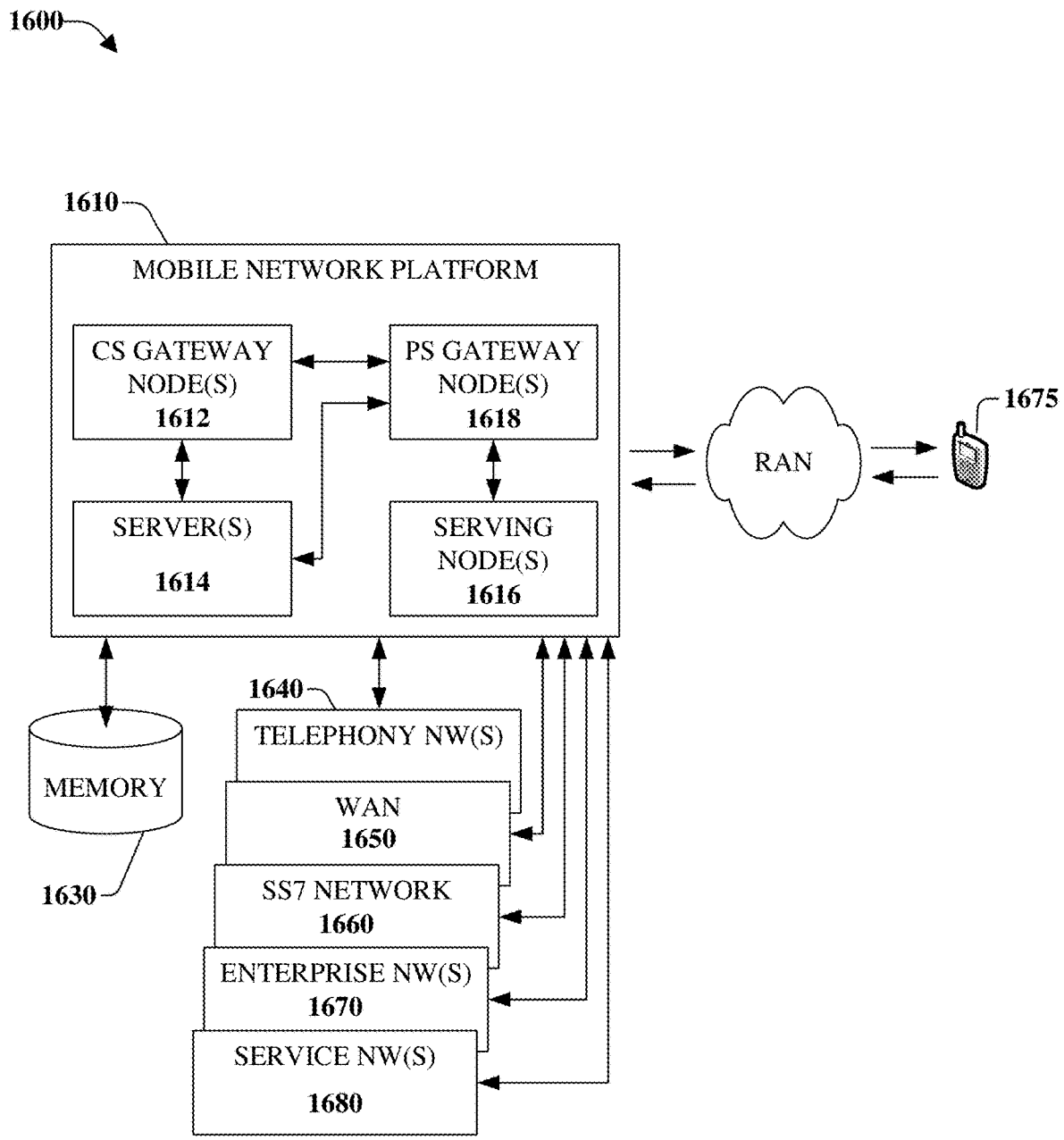
FIG. 16 illustrates an example block diagram of a non-limiting embodiment of a mobile network platform in accordance with various aspects described herein.

Described herein are systems, methods, articles of manufacture, non-transitory machine-readable medium, and other embodiments or implementations that can facilitate secure and confidential location based tracking. FIG. 16 presents an example embodiment 1600 of a mobile network platform 1610 that can implement and exploit one or more aspects of the disclosed subject matter described herein. Generally, wireless network platform 1610 can include components, e.g., nodes, gateways, interfaces, servers, or disparate platforms, which facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 1610 can be included in telecommunications carrier networks and can be considered carrier-side components as discussed elsewhere herein. Mobile network platform 1610 includes CS gateway node(s) 1612 which can interface CS traffic received from legacy networks such as telephony network(s) 1640 (e.g., public switched telephone network (PSTN), or public land mobile network (PLMN)) or a signaling system #7 (SS7) network 1660. Circuit switched gateway node(s) 1612 can authorize and authenticate traffic (e.g., voice) arising from such networks. Additionally, CS gateway node(s) 1612 can access mobility, or roaming, data generated through SS7 network 1660; for instance, mobility data stored in a visited location register (VLR), which can reside in memory 1630. Moreover, CS gateway node(s) 1612 interfaces CS-based traffic and signaling and PS gateway node(s) 1618. As an example, in a 3GPP UMTS network, CS gateway node(s) 1612 can be realized at least in part in gateway GPRS support node(s)

(GGSN). It should be appreciated that functionality and specific operation of CS gateway node(s) 1612, PS gateway node(s) 1618, and serving node(s) 1616, is provided and dictated by radio technology(ies) utilized by mobile network platform 1610 for telecommunication. Mobile network platform 1610 can also include the Mobile Management Entities (MMEs), Home Subscriber Server/Policy and Charging Rules Functions (HSS/PCRFs), Serving Gateways (SGWs), and Packet Data Network Gateways (PGWs) disclosed herein.

In addition to receiving and processing CS-switched traffic and signaling, PS gateway node(s) 1618 can authorize and authenticate PS-based data sessions with served mobile devices. Data sessions can include traffic, or content(s), exchanged with networks external to the wireless network platform 1610, like wide area network(s) (WANs) 1650, enterprise network(s) 1670, and service network(s) 1680, which can be embodied in local area network(s) (LANs), can also be interfaced with mobile network platform 1610 through PS gateway node(s) 1618. It is to be noted that WANs 1650 and enterprise network(s) 1670 can embody, at least in part, a service network(s) such as IP multimedia subsystem (IMS). Based on radio technology layer(s) available in technology resource(s) 1617, packet-switched gateway node(s) 1618 can generate packet data protocol contexts when a data session is established; other data structures that facilitate routing of packetized data also can be generated. To that end, in an aspect, PS gateway node(s) 1618 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1600, wireless network platform 1610 also includes serving node(s) 1616 that, based upon available radio technology layer(s) within technology resource(s) 1617, convey the various packetized flows of data streams received through PS gateway node(s) 1618. It is to be noted that for technology resource(s) 1617 that rely primarily on CS communication, server node(s) can deliver traffic without reliance on PS gateway node(s) 1618; for example, server node(s) can embody at least in part a mobile switching center. As an example, in a 3GPP UMTS network, serving node(s) 1616 can be embodied in serving GPRS support node(s) (SGSN).

For radio technologies that exploit packetized communication, server(s) 1614 in wireless network platform 1610 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 1610. Data streams (e.g., content(s) that are part of a voice call or data session) can be conveyed to PS gateway node(s) 1618 for authorization/authentication and initiation of a data session, and to serving node(s) 1616 for communication thereafter. In addition to application server, server(s) 1614 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1610 to ensure network's operation and data integrity in addition to authorization and authentication procedures that CS gateway node(s) 1612 and PS gateway node(s) 1618 can enact. Moreover, provisioning server(s) can provision services from external network(s) like networks operated by a disparate service provider; for instance, WAN 1650 or Global Positioning System (GPS) network(s) (not shown). Provisioning server(s) can also provision coverage through networks associated to wireless network platform 1610 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1675.

It is to be noted that server(s) 1614 can include one or more processors configured to confer at least in part the functionality of macro network platform 1610. To that end, the one or more processors can execute code instructions stored in memory 1630, for example. It should be appreciated that server(s) 1614 can include a content manager, which operates in substantially the same manner as described hereinbefore.

In example embodiment 1600, memory 1630 can store information related to operation of wireless network platform 1610. Other operational information can include provisioning information of mobile devices served through wireless network platform 1610, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1630 can also store information from at least one of telephony network(s) 1640, WAN 1650, enterprise network(s) 1670, or SS7 network 1660. In an aspect, memory 1630 can be, for example, accessed as part of a data store component or as a remotely connected memory store.

Figure 17:
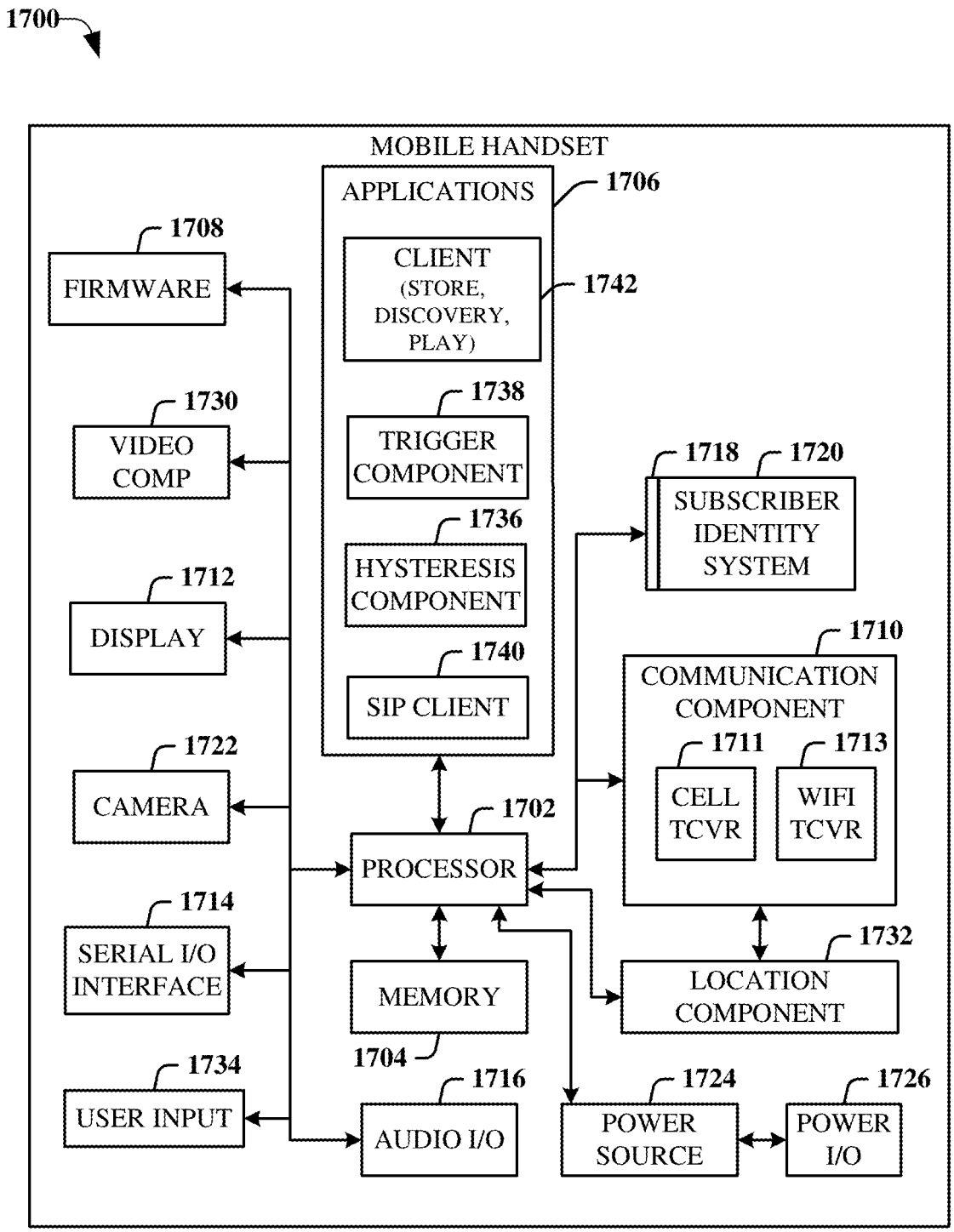
FIG. 17 illustrates an example, non-limiting, block diagram of a handset operable to engage in a system architecture that facilitates wireless communications according to one or more embodiments described herein.

Referring now to FIG. 17, illustrated is an example, non-limiting, block diagram of a handset 1700 operable to engage in a system architecture that facilitates wireless communications according to one or more embodiments described herein. Although a mobile handset is illustrated herein, it will be understood that other devices can be a mobile device and/or UE, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1702 for controlling and processing all onboard operations and functions. A memory 1704 interfaces to the processor 1702 for storage of data and one or more applications 1706 (e.g., a video player software, user feedback component software, etc.). Other applications can include voice recognition of predetermined voice commands that facilitate initiation of the user feedback signals. The applications 1706 can be stored in the memory 1704 and/or in a firmware 1708 and executed by the processor 1702 from either or both the memory 1704 or/and the firmware 1708. The firmware 1708 can also store startup code for execution in initializing the handset 1700. A communications component 1710 interfaces to the processor 1702 to facilitate wired/wireless communication with external systems, e.g., cellular networks, VoIP networks, and so on. Here, the communications component 1710 can also include a suitable cellular transceiver 1711 (e.g., a GSM transceiver) and/or an unlicensed transceiver 1713 (e.g., Wi-Fi, WiMax) for corresponding signal communications. The handset 1700 can be a device such as a cellular telephone, a PDA with mobile communications capabilities, and messaging-centric devices. The communications component 1710 also facilitates communications reception from terrestrial radio networks (e.g., broadcast), digital satellite radio networks, and Internet-based radio services networks.

The handset 1700 includes a display 1712 for displaying text, images, video, telephony functions (e.g., a Caller ID function), setup functions, and for user input. For example, the display 1712 can also be referred to as a "screen" that can accommodate the presentation of multimedia content (e.g., music metadata, messages, wallpaper, graphics, etc.). The display 1712 can also display videos and can facilitate the generation, editing and sharing of video quotes. A serial I/O interface 1714 is provided in communication with the processor 1702 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1700, for example. Audio capabilities are provided with an audio 110 component 1716, which can include a speaker for the output of audio signals related to, for example, indication that the user pressed the proper key or key combination to initiate the user feedback signal. The audio 110 component 1716 also facilitates the input of audio signals through a microphone to record data and/or telephony voice data, and for inputting voice signals for telephone conversations.

The handset 1700 can include a slot interface 1718 for accommodating a SIC (Subscriber Identity Component) in the form factor of a card Subscriber Identity Module (SIM) or universal SIM 1720 and interfacing the SIM card 1720 with the processor 1702. However, it is to be appreciated that the SIM card 1720 can be manufactured into the handset 1700 and updated by downloading data and software.

The handset 1700 can process IP data traffic through the communications component 1710 to accommodate IP traffic from an IP network such as, for example, the Internet, a corporate intranet, a home network, a person area network, etc., through an ISP or broadband cable provider. Thus, VoIP traffic can be utilized by the handset 1700 and IP-based multimedia content can be received in either an encoded or decoded format.

A video processing component 1722 (e.g., a camera) can be provided for decoding encoded multimedia content. The video processing component 1722 can aid in facilitating the generation, editing, and sharing of video quotes. The handset 1700 also includes a power source 1724 in the form of batteries and/or an AC power subsystem, which power source 1724 can interface to an external power system or charging equipment (not shown) by a power 110 component 1726.

The handset 1700 can also include a video component 1730 for processing video content received and, for recording and transmitting video content. For example, the video component 1730 can facilitate the generation, editing and sharing of video quotes. A location tracking component 1732 facilitates geographically locating the handset 1700. As described hereinabove, this can occur when the user initiates the feedback signal automatically or manually. A user input component 1734 facilitates the user initiating the quality feedback signal. The user input component 1734 can also facilitate the generation, editing and sharing of video quotes. The user input component 1734 can include such conventional input device technologies such as a keypad, keyboard, mouse, stylus pen, and/or touchscreen, for example.

Referring again to the applications 1706, a hysteresis component 1736 facilitates the analysis and processing of hysteresis data, which is utilized to determine when to associate with the access point. A software trigger component 1738 can be provided that facilitates triggering of the hysteresis component 1736 when the Wi-Fi transceiver 1713 detects the beacon of the access point. A SIP client 1740 enables the handset 1700 to support SIP protocols and register the subscriber with the SIP registrar server. The applications 1706 can also include a client 1742 that provides at least the capability of discovery, play and store of multimedia content, for example, music.

The handset 1700, as indicated above related to the communications component 1710, includes an indoor network radio transceiver 1713 (e.g., Wi-Fi transceiver). This function supports the indoor radio link, such as IEEE 802.11, for a dual-mode GSM handset. The handset 1700 can accommodate at least satellite radio services through a handset that can combine wireless voice and digital radio chipsets into a single handheld device.

Figure 18:
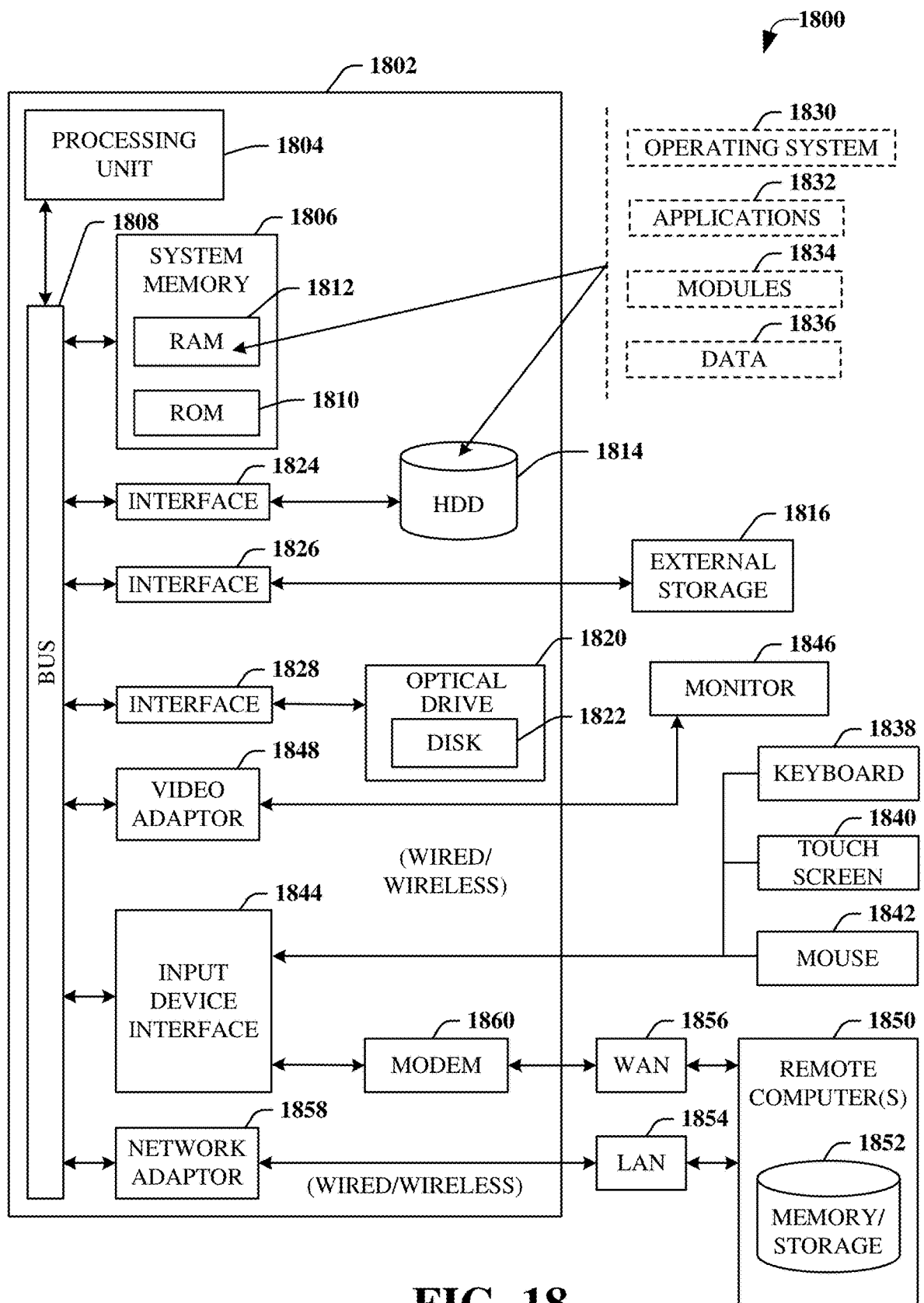
FIG. 18 illustrates an example, non-limiting, block diagram of a computer operable to engage in a system architecture that facilitates wireless communications according to one or more embodiments described herein.

In order to provide additional context for various embodiments described herein, FIG. 18 and the following discussion are intended to provide a brief, general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A Basic Input/Output System (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally include emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can include one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For example, with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired and/or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 and/or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired and/or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other elements, components, etc. for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other elements, components, etc. of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 and/or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or can include a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device," "user equipment" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time requested or required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. First network equipment, comprising:
  a processor; and
  a memory that stores executable instructions that, when executed by the processor, facilitate performance of operations, comprising:
    based on receipt of a request for secure geographic coordinate tracking of a user equipment, forming an aerial mesh communication network with second network equipment, wherein the first network equipment and the second network equipment are moveable network equipment capable of flight;
    determining a first location of the user equipment based on a second location of the first network equipment and a distance between the first network equipment and the user equipment;
    updating the first location of the user equipment as the user equipment is moved within a first range of the first network equipment, resulting in a third location of the user equipment; and
    based on the user equipment moving outside the first range of the first network equipment and into a second range of the second network equipment, transferring monitoring of the user equipment to the second network equipment, wherein the transferring comprises transmitting a signal to the second network equipment, and wherein the signal comprises data indicative of the third location of the user equipment.

2. The first network equipment of claim 1, wherein the distance is a first distance, and wherein the operations further comprise:
prior to the determining of the first location of the user equipment, determining the second location of the first network equipment based on obtaining first information indicative of a geographic coordinate of a location source that comprises a confirmed location and based on a second distance between the location source and the first network equipment.

3. The first network equipment of claim 2, wherein the location source is stationary network equipment.

4. The first network equipment of claim 2, wherein the location source is the user equipment, wherein the user equipment is executing a global positioning system prior to sending the request, and wherein the operations further comprise:
after the receipt of the request, sending, to the user equipment, acceptance of the request, wherein the global positioning system is disabled at the user equipment based on the acceptance of the request.

5. The first network equipment of claim 1, wherein the first network equipment and the second network equipment are deployed from an aircraft into an aerial environment.

6. The first network equipment of claim 1, wherein the operations further comprise:
determining that capabilities of the first network equipment are not currently demanded; and
entering a sleep mode while maintaining a current aerial position.

7. The first network equipment of claim 1, wherein the first network equipment is disposable.

8. The first network equipment of claim 7, wherein the operations further comprise:
based on a useable life of the first network equipment, determining that the first network equipment is to be disposed; and
based on a current location of the first network equipment, facilitating an environmentally conscious disposal of the first network equipment according to a criterion indicating that the environmentally conscious disposal is environmentally conscious.

9. The first network equipment of claim 1, wherein the first network equipment is an unmanned autonomous vehicle.

10. The first network equipment of claim 1, wherein the first network equipment is charged via renewable energy power from a renewable energy power source.

11. The first network equipment of claim 1, wherein the user equipment is classified as an internet of everything device.

12. The first network equipment of claim 1, wherein the first network equipment is configured to operate according to at least a fifth generation wireless protocol.

13. A method, comprising:
facilitating, by a system comprising a processor, formation of an aerial mesh network that comprises unmanned autonomous vehicles;
monitoring, by the system, movement of a user equipment as the user equipment moves within range of the unmanned autonomous vehicles, wherein the monitoring comprises receiving, from the unmanned autonomous vehicles, respective information indicative of a current location of the user equipment; and
facilitating, by the system, transmitting signals to the user equipment, wherein the signals comprise the information indicative of the current location of the user equipment, and wherein the transmitting is via a secure communication channel.

14. The method of claim 13, further comprising:
prior to the formation of the aerial mesh network, facilitating, by the system, receiving, from the user equipment, a request to enable a private location based service for the user equipment, wherein the request is facilitated via an application executing on the user equipment.

15. The method of claim 13, further comprising:
determining, by the system, that usage of an unmanned autonomous vehicle of the unmanned autonomous vehicles is not currently requested; and
facilitating, by the system, a change in status of the unmanned autonomous vehicle, wherein the change in status is a transition of the unmanned autonomous vehicle from a first state to a second state, wherein the second state is a stand-by mode.

16. The method of claim 13, further comprising:
determining, by the system, that an unmanned autonomous vehicle of the unmanned autonomous vehicles is to be destroyed; and
facilitating, by the system, a destruction of the unmanned autonomous vehicle in accordance with defined environmental conditions.

17. The method of claim 13, wherein the facilitating of the formation of the aerial mesh network comprises:
facilitating, by the system, dispersal of the unmanned autonomous vehicles from an aircraft.

18. The method of claim 17, wherein the facilitating of the dispersal is in a geographic area that is experiencing jamming of network equipment, resulting in lack of communication between the network equipment and the user equipment.

19. A non-transitory machine-readable medium, comprising executable instructions that, when executed by a processor of network equipment, facilitate performance of operations, comprising:
deploying a group of disposable satellite devices in a defined geographic area, wherein the deploying comprises forming an aerial mesh communication network that comprises the group of disposable satellite devices, and wherein the group of disposable satellite devices is independent of network equipment currently dispersed within the defined geographic area;
receiving, from a first disposable satellite device of the group of disposable satellite devices, coordinate information associated with a monitored user equipment based on the monitored user equipment being within a communication range of the first disposable satellite device;
communicating the coordinate information to the monitored user equipment via a secure communication channel, wherein the secure communication channel bypasses a communication channel established between the monitored user equipment and the network equipment currently dispersed within the defined geographic area; and
based on the monitored user equipment moving outside a first range of the first disposable satellite device into a second range of a second disposable satellite device of the group of disposable satellite devices, transferring monitoring of the user equipment to the second disposable satellite device.

20. The non-transitory machine-readable medium of claim 19, wherein the coordinate information is first coordinate information, wherein the communication range is a first communication range, and wherein the operations further comprise: receiving, from a second disposable satellite device of the group of disposable satellite devices, second coordinate information associated with the monitored user equipment based on the monitored user equipment moving from the first range of the first disposable satellite device to a second range of the second disposable satellite device; and communicating the second coordinate information to the monitored user equipment via the secure communication channel.

* * * * *